US012767829B2

(12) United States Patent
Hikata et al.

(10) Patent No.: US 12,767,829 B2
(45) Date of Patent: Oct. 20, 2026

(54) COLORANT, MASTER BATCH CONTAINING SAME, COLORED RESIN COMPOSITION, AND MOLDED ARTICLE

(71) Applicant: ORIENT CHEMICAL INDUSTRIES CO., LTD., Osaka (JP)

(72) Inventors: Jun Hikata, Neyagawa (JP); Yuta Furuno, Neyagawa (JP); Moe Kai, Neyagawa (JP); Hideka Iwai, Neyagawa (JP); Akari Taniguchi, Neyagawa (JP)

(73) Assignee: ORIENT CHEMICAL INDUSTRIES CO., LTD., Osaka (JP)

( * ) Notice: Subject to any disclaimer, the term of this patent is extended or adjusted under 35 U.S.C. 154(b) by 724 days.

(21) Appl. No.: 17/917,855

(22) PCT Filed: Apr. 5, 2021

(86) PCT No.: PCT/JP2021/014508
§ 371 (c)(1),
(2) Date: Oct. 7, 2022

(87) PCT Pub. No.: WO2021/206059
PCT Pub. Date: Oct. 14, 2021

(65) Prior Publication Data

US 2023/0151219 A1 May 18, 2023

(30) Foreign Application Priority Data

Apr. 7, 2020 (JP) ................................ 2020-069258

(51) Int. Cl.

| | |
|---|---|
| ***C09B 57/12*** | (2006.01) |
| ***C08J 3/22*** | (2006.01) |
| ***C08K 5/3465*** | (2006.01) |
| ***C08K 5/357*** | (2006.01) |
| ***C08K 5/45*** | (2006.01) |
| ***C09B 67/20*** | (2006.01) |

(52) U.S. Cl.
CPC ............... *C09B 57/12* (2013.01); *C08J 3/226* (2013.01); *C08K 5/3465* (2013.01); *C08K 5/357* (2013.01); *C08K 5/45* (2013.01); *C09B 67/0063* (2013.01); *C08J 2377/06* (2013.01); *C08J 2381/02* (2013.01)

(58) Field of Classification Search
CPC ..... C09B 57/12; C09B 67/0063; C09B 57/00; C09B 57/08; C09B 67/006; C08J 3/226; C08J 2377/06; C08J 2381/02; C08J 2477/06; C08K 5/3465; C08K 5/357; C08K 5/45; C08K 5/0041; C08K 5/3447; C08G 69/48; C08L 77/06; C08L 67/00; C08L 69/00; C08L 77/00; C08L 81/02; C08L 101/00
See application file for complete search history.

(56) References Cited

U.S. PATENT DOCUMENTS

| | | | | |
|---|---|---|---|---|
| 3,306,904 | A | 2/1967 | Sieber | |
| 3,819,632 | A | 6/1974 | Burdeska | |
| 4,028,102 | A | 6/1977 | Rochlitz et al. | |
| 4,179,179 | A * | 12/1979 | Lowden | H01R 27/00 439/954 |
| 4,405,734 | A * | 9/1983 | Fuchs | D01F 1/06 524/90 |
| 4,699,982 | A | 10/1987 | Niwa et al. | |
| 5,071,482 | A | 12/1991 | Dietz et al. | |
| 6,462,128 | B1 | 10/2002 | Barashkov et al. | |
| 2001/0012905 | A1 | 8/2001 | Shershukov et al. | |
| 2005/0244364 | A1 | 11/2005 | Luukas et al. | |
| 2008/0249211 | A1 * | 10/2008 | Smink | C08J 3/226 523/351 |
| 2014/0103374 | A1 * | 4/2014 | Koenemann | C09K 11/06 546/52 |
| 2015/0034382 | A1 * | 2/2015 | Yoshida | H02G 3/0481 174/72 A |
| 2017/0037249 | A1 | 2/2017 | Oguchi et al. | |
| 2019/0040210 | A1 * | 2/2019 | Gaukroger | C08K 5/098 |

FOREIGN PATENT DOCUMENTS

| | | | |
|---|---|---|---|
| CN | 1563005 | A | 1/2005 |
| CN | 106995442 | A | 8/2017 |
| DE | 863698 | C | 1/1953 |
| DE | 3135328 | A1 | 3/1983 |

(Continued)

OTHER PUBLICATIONS

Ling et al (Building pH sensors into paper-based small-molecular logic systems for very simple detection of edges of objects J. Am. Chem. Soc. 2015, 137, 11, 3763â3766). (Year: 2015).*
Christmann (Liebigs Ann. Chem, 716, 147-155 (1968)—machine translation (Year: 1968).*
Christmann (Liebigs Ann. Chem, 716, 147-155 (1968) (Year: 1968).*
Jun. 29, 2021 International Search Report issued in Patent Application No. PCT/JP2021/014508.
Mar. 27, 2025 Office Action issued in Japanese Application No. 2022-514068.
Jun. 17, 2023 Office Action issued in Chinese Application No. 202180027199.5.

(Continued)

*Primary Examiner* — Doris L Lee
(74) *Attorney, Agent, or Firm* — Oliff PLC

(57) ABSTRACT

A colorant which has high heat resistance and thus causes neither discoloration nor fading even when exposed for a long period of time under long-term high-temperature conditions, and which has excellent bleed resistance and sublimation resistance and thus causes neither color migration to molds or other resin components, nor deterioration of physical properties of a thermoplastic resin added thereto. The colorant includes at least one compound represented by a specified chemical formula (1a), at least one compound represented by a specified chemical formula (1b), and/or at least one compound represented by a specified chemical formula (1c).

8 Claims, No Drawings

(56) References Cited

FOREIGN PATENT DOCUMENTS

| | | | | | |
|---|---|---|---|---|---|
| EP | 2144918 | B1 | | 11/2010 | |
| EP | 2778161 | A1 | | 9/2014 | |
| FR | 1108109 | A | | 1/1956 | |
| JP | S47-31684 | | | 12/1972 | |
| JP | S50-75214 | A | | 6/1975 | |
| JP | S51-1778 | A | | 1/1976 | |
| JP | S51-22736 | A | | 2/1976 | |
| JP | S52-85218 | A | | 7/1977 | |
| JP | S54-19012 | A | | 2/1979 | |
| JP | S54-65749 | A | | 5/1979 | |
| JP | S58-53944 | A | | 3/1983 | |
| JP | S60-250052 | A | | 12/1985 | |
| JP | S61-62565 | A | | 3/1986 | |
| JP | H02-115278 | A | | 4/1990 | |
| JP | 2002-080607 | A | | 3/2002 | |
| JP | 2013-223342 | A | | 10/2013 | |
| JP | 2015-189787 | A | | 11/2015 | |
| JP | 2018-095722 | A | | 6/2018 | |
| KR | 101977321 | B1 | | 5/2019 | |
| WO | 95/23890 | A1 | | 1/1995 | |
| WO | 02/066563 | A1 | | 8/2002 | |
| WO | WO-02066562 | A1 | * | 8/2002 | ............ C09B 57/08 |
| WO | 2005089094 | A2 | | 9/2005 | |
| WO | 2005/100359 | A1 | | 10/2005 | |
| WO | 2016/046034 | A1 | | 3/2016 | |
| WO | 2016/062657 | A1 | | 4/2016 | |

OTHER PUBLICATIONS

Mar. 16, 2024 Office Action issued in Chinese Application No. 202180027199.5.

Jul. 5, 2024 Office Action issued in Chinese Application No. 202180027199.5.

Feb. 26, 2025 Office Action issued in Chinese Application No. 202180027199.5.

Ling Jue et al, "Building pH Sensors into Paper-Based Small-Molecular Logic Systems for Very Simple Detection of Edges of Objects", Journal of the American Chemical Society, Mar. 9, 2015.

Sanaz Seraj et al, "Naphthalimide-based optical turn-on sensor for monosaccharide recognition using boronic acid receptor", Royal Society of Chemistry, RSC Advances, May 26, 2019.

Meenakshi Verma et al, "Synthesis, in vitro evaluation and molecular modelling of naphthalimide analogue as anticancer agents", European Journal of Medicinal Chemistry, Elsevier, Aug. 11, 2013.

Aug. 20, 2024 Office Action issued in European Application No. 21784012.3.

Sanaz Seraj et al, "Fructose recognition using new "Off-On" fluorescent chemical probes based on boronate-tagged 1,8-naphthalimide", Royal Society of Chemistry, Nov. 9, 2018.

Alaa M.M. El-Betany, The synthesis and study of fluorescent PAMAM-based dendritic molecules, Tetrahedron 69, Elsevier, Jul. 20, 2013.

Jung Feng Lee et al, "A new intramolecular donor-acceptor polyfluorene copolymer for bulk heterojunction solar cells", Science Direct Solor Energy Materials and Solar Cells, Elsevier, Mar. 29, 2010.

Jung Feng Lee et al, "Low bandgap carbazole copolymers containing an electron-withdrawing side chain for solar cell applications", Solar Energy Materials and Solar Cells 95, Elsevier, Jun. 17, 2011.

Zivic Nicolas et al, "Novel naphthalimide-amine based photoinitiators operating under violet and blue LEDs and usable for various polymerization reactions and synthesis of hydrogels", Polym. Chem., 2016, 7, 418, Oct. 30, 2015.

Kadhim AM et al, A new intramolecular cyclisation reation-Novel Synthesis of Benzo(k,1)Thioxanthene-3,4-Dicarboxylic Anhydride and Derived Dyestuffs, Tetrahedron, vol. 30, pp. 2245-2249, Nov. 27, 1973.

Christmann Otto, "Synthesen in der Perimidin-Reihe, II", Liebigs Ann. Chem. 716, pp. 147-155 (Jan. 25, 1968).

Jan. 7, 2025 Office Action issued in European Application No. 21784012.3.

Sep. 9, 2025 Office Action issued in Japanese Application No. 2022-514068.

Ewa Mykowska, "Spectral properties of derivatives of naphthoylenebenzimidazole in isotropic and liquid crystalline media", SPIE, vol. 3318, (Feb. 1, 1998), pp. 378-381.

Peters et al, "Amino Derivatives of 1,8-Naphthalic Anhydride and Derived Dyes for Synthetic-Polymer Fibers", Dyes and Pigments, 6, (1985) pp. 349-375.

Nov. 24, 2025 Office Action issue in Korean Patent Application No. 10-2022-7034522.

B.K. Manukian, Helvetica Chimca Acta, vol. 48, Installment 8, No. 216, (1965) pp. 1999-2004.

* cited by examiner

COLORANT, MASTER BATCH CONTAINING SAME, COLORED RESIN COMPOSITION, AND MOLDED ARTICLE

TECHNICAL FIELD

The present invention relates to a colorant containing a compound having a specific structure, and a master batch containing same, a colored resin composition, and a molded article.

BACKGROUND OF THE ART

Hybrid vehicles (HV) and electric vehicles (EV) driven by motors are equipped with batteries that produce voltages of 60V or more, which are much higher than batteries employed in conventional vehicles driven only by engines. The color of high-voltage wire harnesses, such as electrical cables and connectors that connect to such high-voltage batteries, is specified by standards to be orange for the housing of its connectors and wire sheathing, for the purpose of visually and clearly indicating that a high-voltage current is flowing. For example, in the United States, it is specified in American Automobile Standard SAE J1673. The shade or lightness of the orange varies on respective countries, such as slightly darker orange, brighter orange, and even fluorescent orange.

Since high-voltage wire harnesses are exposed to heat generated from parts whose temperature rises due to operation of batteries, motors, inverters and engines for long period of time, for example, a high heat-resistant thermoplastic resin such as a polyamide resin is employed in order to form the high-voltage wire harnesses. Such high heat-resistant thermoplastic resin is molded at high temperature of 250 to 350° C. Therefore, the colorant that imparts orange color to the thermoplastic resin is required to have high heat resistance to withstand high temperature during molding of the thermoplastic resin and high heat emitted from batteries and the like and to prevent discoloration and fading even for a long period of time (about 10 years, the life of a battery); sublimation resistance to prevent contamination of molds and molding machines used for molding the thermoplastic resin; and high bleed resistance to prevent color migration upon contact with other thermoplastic resin products.

It is known that a dye exhibiting orange color can be prepared by mixing a perinone-based dye or a naphthalimide-based dye with other color dyes or pigments. Patent Document 1 discloses a perinone-based dye that colors a thermoplastic resin orange. The naphthalimide-based dye is, for example, commercially available as C.I. Solvent Yellow 44, 104 and 116, and C.I. Disperse Yellow 11. These naphthalimide-based dyes have an amino group as a chromophore and exhibit bright color with a lightness L* value of 70 or more in the CIE-Lab color space coordinates, thus making it possible to obtain vivid orange color. By molding a colored resin composition prepared by mixing a master batch, which is prepared by kneading the orange dye and a thermoplastic resin raw material, with a thermoplastic resin raw material which is the same as or different from the thermoplastic resin raw material contained therein and various additives, molded articles for connectors of high-voltage wire harnesses are produced.

The above dyes have relatively simple structures and low molecular weights, which facilitates toning to obtain orange color. On the other hand, it is difficult to say that orange color prepared from these dyes has the heat resistance, bleed resistance and sublimation resistance which enable application to connectors of automotive high-voltage wire harnesses.

Meanwhile, Patent Document 2 discloses a method in which powders of titanium dioxide, zinc peroxide and tin oxide are mixed and calcined at 850° C., and then the calcined product thus obtained is pulverized to produce a high heat-resistant orange inorganic pigment for polyamide resin. The pigment is excellent in bleed resistance and sublimation resistance but lack clarity and may turn brown or dark due to heat history. Since the pigment is not dissolved in thermoplastic resin like the dye, but is dispersed in the thermoplastic resin, it may cause deterioration of physical properties such as tensile strength and impact strength.

PRIOR ART DOCUMENT

Patent Document

[Patent Document 1] Japanese Examined Patent Application Publication No. S54-19012 B
[Patent Document 2] Korean Patent No 10-1977321B1

SUMMARY OF THE INVENTION

Problems to be Solved by the Invention

The present invention has been made to solve the above-mentioned problems, and an object thereof is to provide a colorant which has high heat resistance and thus cause neither discoloration nor fading even when exposed for a long period of time under long-term high-temperature conditions, and which has excellent bleed resistance and sublimation resistance and thus causes neither color migration to molds or other resin parts, nor deterioration of physical properties of a thermoplastic resin added thereto; and a master batch containing same; a colored resin composition; and a molded article obtained from the colored resin composition.

Means for Solving the Problems

The colorant developed to achieve the objects mentioned above comprises: at least one compound represented by the following chemical formula (1a):

[Chemical Formula 1]

(1a)

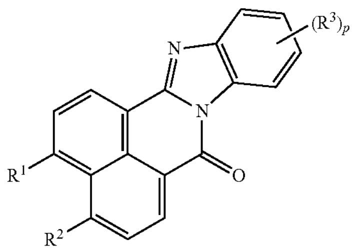

wherein, in the chemical formula (1a), $R^1$ and $R^2$ are each independently a hydrogen atom, an optionally substituted amino group or nitrogen-containing heterocyclic group, and both are not simultaneously hydrogen atoms, or are combined together to form a fused ring, $R^3$ is at least one selected from a straight or branched alkoxy group having 1 to 4 carbon atoms, a carboxy group, a hydroxy group, a sulfo group and a sulfonamide group, and p is a number of 0 to 2, at least one compound represented by the following chemical formula (1b):

[Chemical Formula 2]

(1b)

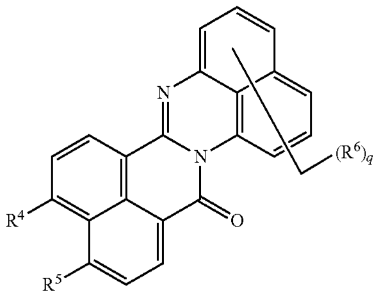

wherein, in the chemical formula (1b), $R^4$ and $R^5$ are each independently a hydrogen atom or an optionally substituted amino group or nitrogen-containing heterocyclic group, and both are not simultaneously hydrogen atoms, $R^6$ is at least one selected from a straight or branched alkoxy group having 1 to 4 carbon atoms, a carboxy group, a hydroxy group, a sulfo group and a sulfonamide group, q is a number of 0 to 4, and/or at least one compound represented by the following chemical formula (1c):

[Chemical Formula 3]

(1c)

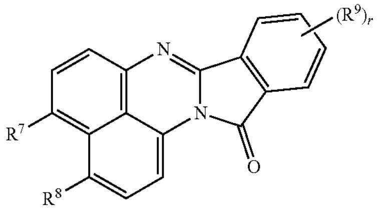

wherein, in the chemical formula (1c), $R^7$ and $R^8$ are each independently a hydrogen atom or an optionally substituted amino group or nitrogen-containing heterocyclic group, $R^9$ is at least one selected from a straight or branched alkoxy group having 1 to 4 carbon atoms, a carboxy group, a hydroxy group, a sulfo group and a sulfonamide group, and r is a number of 0 to 2.

In the colorant, the compound represented by the chemical formula (1a) may include a compound in which $R^1$ or $R^2$ is the nitrogen-containing heterocyclic group and a compound in which $R^1$ and $R^2$ are the fused rings combined together.

In the colorant, the nitrogen-containing heterocyclic group includes, for example, at least one selected from a morpholino group, a piperidinyl group, a pyrrolidinyl group and a piperazinyl group.

In the colorant, the amino group and/or the nitrogen-containing heterocyclic group may have at least one substituent selected from a straight or branched alkyl group having 1 to 4 carbon atoms, a straight or branched alkoxy group having 1 to 4 carbon atoms, a hydroxy group and a carboxy group.

In the colorant, chemical formula (1a) in which $R^1$ and $R^2$ are the fused rings includes, for example, those represented by the following chemical formula ($1a_2$):

[Chemical Formula 4]

($1a_2$)

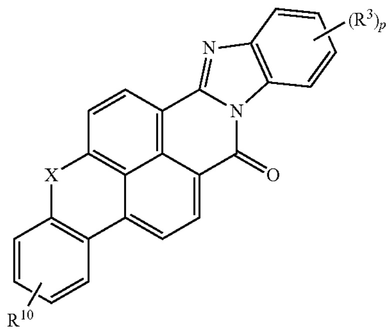

wherein, in the chemical formula ($1a_2$), $R^3$ and p are the same as in the chemical formula (1a), $R^{10}$ is a hydrogen atom, a carboxy group, or a straight or branched alkyl group having 1 to 4 carbon atoms, and X is a nitrogen atom, an oxygen atom or a sulfur atom.

A master batch of the present invention comprises any colorant mentioned above and a thermoplastic resin.

In the master batch, the content of the colorant may be 5 to 30% by mass.

A colored resin composition of the present invention comprises any colorant mentioned above, and/or any master batch mentioned above, and a thermoplastic resin.

In the colored resin composition, the thermoplastic resin may include at least one selected from a polyamide resin, a polyolefin resin, a polyester resin, a polycarbonate resin and a polyphenylene sulfide resin.

A molded article of the present invention is formed by any colored resin composition mentioned above.

The molded article may be a connector housing for automotive wire harnesses.

Effects of the Invention

The colorant of the present invention exhibits high heat resistance, high light resistance and bleed resistance, and is highly compatible with the thermoplastic resin contained in the master batch and the colored resin composition, and thus causes no deterioration of mechanical strength properties such as tensile strength and impact strength that are originally possessed by the thermoplastic resin.

Since the compounds represented by the above chemical formulas (1a) to (1c) have a nitrogen-containing chromophore substituent such as an amino group or a nitrogen-containing heterocyclic group, the molded article formed from the master batch and colored resin composition each containing the colorant of the present invention has a high-brightness hue with excellent visibility.

Since the master batch and colored resin composition each containing the colorant of the present invention have high heat resistance and high light resistance, they are suitable for the production of molded articles that are required to cause neither discoloration nor fading.

MODE FOR CARRYING OUT THE INVENTION

Hereinafter, embodiments to practice the present invention will be described in detail, but the scope of the present invention is not restricted by these embodiments.

(Colorant)

The compound included essentially in the colorant of the present invention comprises at least one compound represented by the following chemical formula (1a):

[Chemical Formula 5]

(1a)

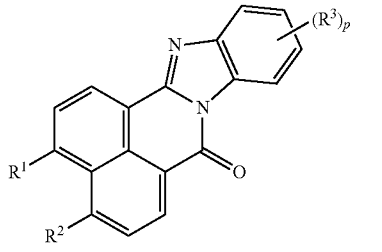

wherein, in the chemical formula (1a), $R^1$ and $R^2$ are each independently a hydrogen atom, an optionally substituted amino group or nitrogen-containing heterocyclic group, and both are not simultaneously hydrogen atoms, or are combined together to form a fused ring, $R^3$ is at least one selected from a straight or branched alkoxy group having 1 to 4 carbon atoms, a carboxy group, a hydroxy group, a sulfo group and a sulfonamide group, and p is a number of 0 to 2, at least one compound represented by the following chemical formula (1b):

[Chemical Formula 6]

(1b)

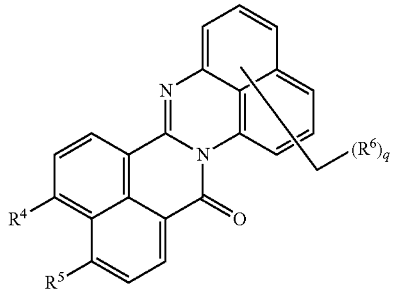

wherein, in the chemical formula (1b), $R^4$ and $R^5$ are each independently a hydrogen atom or an optionally substituted amino group or nitrogen-containing heterocyclic group, and both are not simultaneously hydrogen atoms, $R^6$ is at least one selected from a straight or branched alkoxy group having 1 to 4 carbon atoms, a carboxy group, a hydroxy group, a sulfo group and a sulfonamide group, and q is a number of 0 to 4, and/or at least one compound represented by the following chemical formula (1c)

[Chemical Formula 7]

(1c)

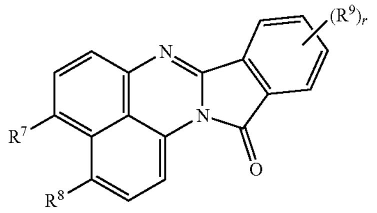

wherein, in the chemical formula (1c), $R^7$ and $R^8$ are each independently a hydrogen atom or an optionally substituted amino group or nitrogen-containing heterocyclic group, $R^9$ is at least one selected from a straight or branched alkoxy group having 1 to 4 carbon atoms, a carboxy group, a hydroxy group, a sulfo group and a sulfonamide group, and r is a number of 0 to 2.

The compounds of the chemical formulas (1a) to (1c) are common in that they are fused ring compounds having a benzoisoquinoline ring as a central skeleton. Specifically, the compound of the chemical formula (1a) is a benzimidazole ring-containing fused ring compound in which the benzimidazole ring is fused to the central skeleton, and the compound of the chemical formula (1b) is a pyrimidine ring-containing fused ring compound in which the pyrimidine ring is fused to the central skeleton, and the compound of the chemical formula (1c) is an isoindolinone ring-containing fused ring compound in which the isoindolinone ring is fused to the central skeleton.

Examples of the nitrogen-containing heterocyclic group as for $R^1$ and $R^2$ in the chemical formula (1a), $R^4$ and $R^5$ in the chemical formula (1b) and $R^7$ and $R^8$ in the chemical formula (1c) include a morpholino group, a piperidinyl group, a pyrrolidinyl group and a piperazinyl group. When both $R^1$ and $R^2$ are nitrogen-containing heterocyclic groups, both nitrogen-containing heterocyclic groups may be the same or different. The same applies to $R^4$ and $R^5$, and $R^7$ and $R^8$.

When $R^1$, $R^2$, $R^4$, $R^5$, $R^7$ and $R^8$ are an amino group, a piperidinyl group, a pyrrolidinyl group or a piperazinyl group, these groups may be substituted. Examples of the substituent include a straight or branched alkyl group having 1 to 4 carbon atoms, a straight or branched alkoxy group having 1 to 4 carbon atoms, a hydroxy group and carboxy group. Examples of the alkyl group include a methyl group, an ethyl group, an n-propyl group, an isopropyl group, an n-butyl group, a sec-butyl group and a tert-butyl group. Examples of the alkoxy group include a methoxy group, an ethoxy group, an n-propoxy group, an isopropoxy group, an n-butoxy group, a sec-butoxy group and a tert-butoxy group.

When $R^1$ and $R^2$ in the chemical formula (1a) are combined together to form a fused ring, this fused ring has a heteroatom X, and examples of X include a nitrogen atom, an oxygen atom and a sulfur atom.

Examples of the alkoxy group as for $R^3$ in the chemical formula (1a), $R^6$ in the chemical formula (1b) and $R^9$ in the chemical formula (1c) include a methoxy group, an ethoxy group, an n-propoxy group, an isopropoxy group, an n-butoxy group, a sec-butoxy group and a tert-butoxy group. When $R^3$, $R^6$ and $R^9$ are a sulfonamide group represented by "$—SO_2N(R^a)_2$", it is preferable that a plurality of $R^a$ are each independently a hydrogen atom, a straight or branched alkyl group having 1 to 4 carbon atoms, or a straight or branched alkoxy group having 1 to 4 carbon atoms. Examples of the alkyl group include a methyl group, an ethyl group, an n-propyl group, an isopropyl group, an n-butyl group, a sec-butyl group and a tert-butyl group, and examples of the alkoxy group include a methoxy group, an ethoxy group, an n-propoxy group, an isopropoxy group, an n-butoxy group, a sec-butoxy group and a tert-butoxy group. Meanwhile, $R^3$, $R^6$ and $R^9$ are a sulfonamide group represented by "$—NH(SO)_2R^b$", examples of $R^b$ include the same as the above $R^a$. The substitution positions of these $R^3$, $R^6$ and $R^9$ are not particularly limited.

p in the chemical formula (1a) and r in the chemical formula (1c) are a number of 0 to 2, and preferably 1. q in the chemical formula (1b) is a number of 0 to 4, specifically an integer of 0, 1, 2, 3 and 4, and preferably 0.

The benzimidazole ring-containing fused ring compound of the chemical formula (1a) exhibits orange color. Specific examples thereof are represented by the following chemical formula ($1a_1$-1).

[Chemical Formula 8]

($1a_1$-1)

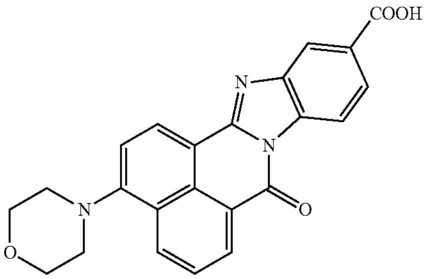

This benzimidazole ring-containing fused ring compound is obtained by reacting a naphthalic anhydride derivative such as 4-bromonaphthalic anhydride with morpholine, followed by a reaction with 3,4-diaminobenzoic acid. This reaction produces four benzimidazole ring-containing fused ring compound isomers. The content ratio of the isomers is arbitrary. Any one compound of these isomers may be selectively produced, or a mixture of isomers may be produced, followed by separation of isomers with a column. The isomers comprehensively represented by the chemical formula ($1a_1$-1) are represented by the following chemical formulas ($1a_1$-1-1) to ($1a_1$-4).

[Chemical Formula 9]

($1a_1$-1-1)

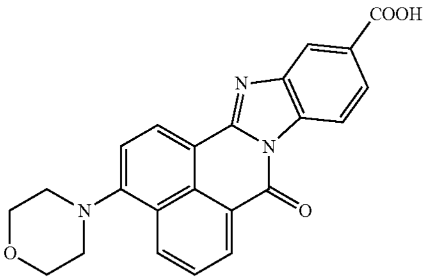

($1a_1$-1-2)

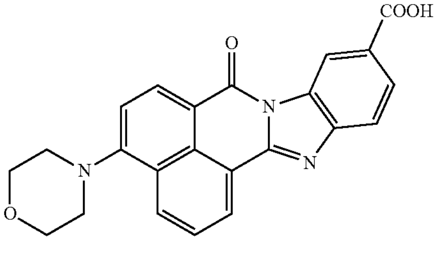

-continued ($1a_1$-1-3)

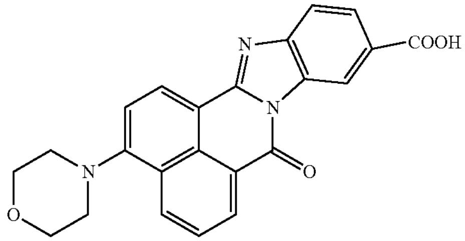

($1a_1$-1-4)

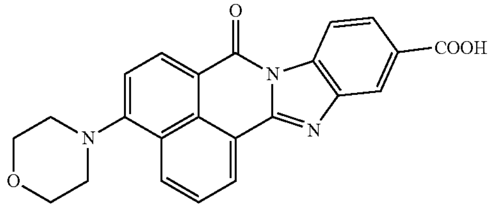

As used herein, for convenience, the structures of compounds included within the scope of the present invention are sometimes represented by one chemical formula comprehensively to omit the chemical formulas of the isomer structures. Specifically, for example, chemical formula ($1a_1$-1) also includes isomers optionally included in the production process, such as those represented by the chemical formulas ($1a_1$-1-1) to ($1a_1$-4).

Other specific examples of the benzimidazole ring-containing fused ring compound represented by the chemical formula (1a) include those represented by the following chemical formulas ($1a_1$-2) to ($1a_1$-8).

[Chemical Formula 10]

($1a_1$-2)

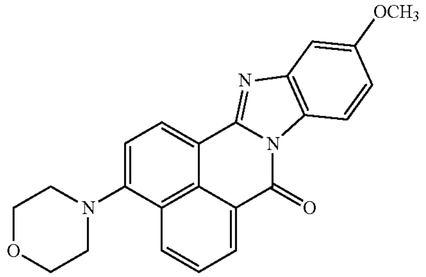

($1a_1$-3)

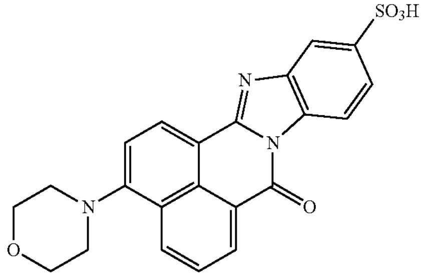

-continued (1a$_1$-4)

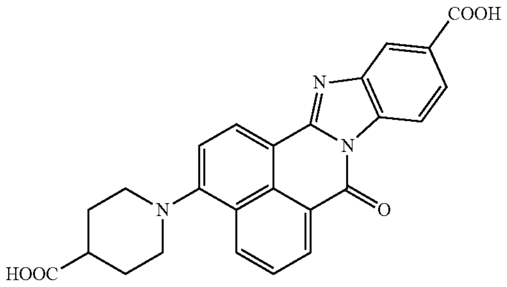

(1a$_1$-5)

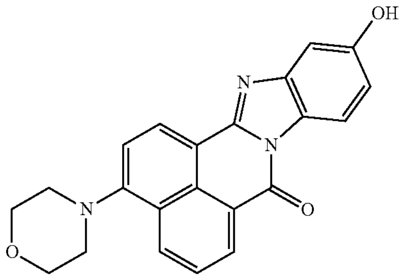

(1a$_1$-6)

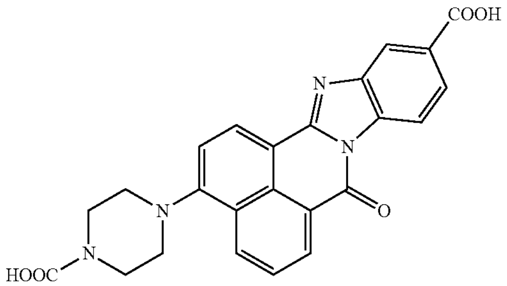

(1a$_1$-7)

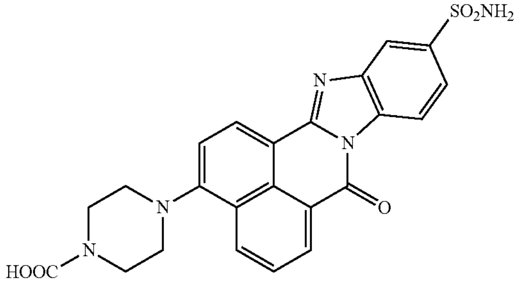

(1a$_1$-8)

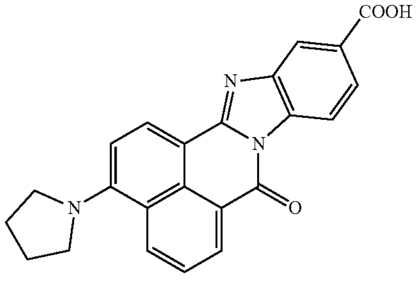

In the chemical formula (1a), when at least one of $R^1$ and $R^2$ is a nitrogen-containing heterocyclic group and $R^3$ is a carboxy group, it is preferable that the benzimidazole ring-containing fused ring compound exhibits higher heat resistance and bleed resistance and is excellent in color developability and compatibility with the thermoplastic resin mentioned later. This is because the nitrogen-containing heterocyclic group as for $R^1$ and/or $R^2$ acts as a chromophore and improves heat resistance, and the carboxy group as for $R^3$ improves the heat resistance and bleed resistance. Particularly, when the thermoplastic resin is a polyamide resin, $R^3$ is more preferably a carboxy group. In this case, the bleed resistance is remarkably improved. It is presumed that this is because the amide group or carboxy group in the polyamide resin molecule and the carboxy group in the benzimidazole ring-containing fused ring compound form an intermolecular hydrogen bond to suppress the generation of a bleed phenomenon.

Still another example of the benzimidazole ring-containing fused ring compound represented by the chemical formula (1a) includes a compound in which $R^1$ and $R^2$ are combined together to form a fused ring, which is specifically represented by the following chemical formula (1a$_2$):

[Chemical Formula 11]

(1a$_2$)

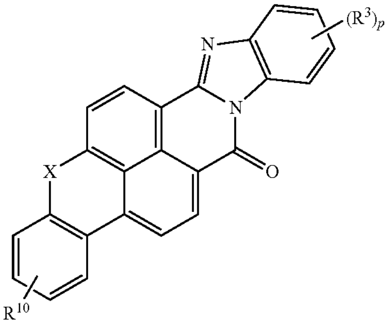

wherein, in the chemical formula (1a$_2$), $R^3$ and p are the same as in the chemical formula (1a), $R^{10}$ is a hydrogen atom, a carboxy group, or a straight or branched alkyl group having 1 to 4 carbon atoms, and X is a nitrogen atom, an oxygen atom or a sulfur atom.

Examples of the alkyl group as for $R^{10}$ in the chemical formula (1a$_2$) include a methyl group, an ethyl group, an n-propyl group, an isopropyl group, an n-butyl group, a sec-butyl group and a tert-butyl group.

Specific examples of the benzimidazole ring-containing fused ring compound represented by the chemical formula (1a$_2$) include a compound represented by the following chemical formula (1a$_2$-1). This compound exhibits a reddish orange color (red orange).

[Chemical Formula 12]

(1a$_2$-1)

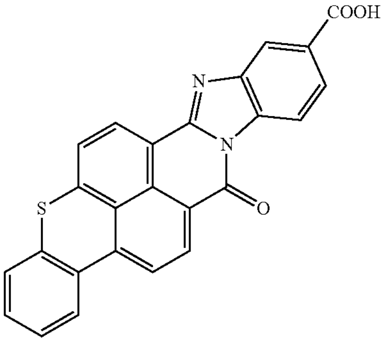

The benzimidazole ring-containing fused ring compound represented by the chemical formula ($1a_2$-1) has a thioxanthene structure in part of its structure. This benzimidazole ring-containing fused ring compound is obtained by reacting 2-aminobenzenethiol with 4-bromonaphthalic anhydride to obtain a naphthalimide thioether body, followed by a ring closure reaction to form a xanthene body and further reaction with 3,4-diaminobenzoic acid. This reaction produces four benzimidazole ring-containing fused ring compound isomers. The content ratio of the isomers is arbitrary. Any one compound of these isomers may be selectively produced, or a mixture of isomers may be produced, followed by separation of isomers with a column. The isomers comprehensively represented by the chemical formula ($1a_2$-1) are represented by the following chemical formulas ($1a_2$-1-1) to ($1a_2$-1-4).

[Chemical Formula 13]

($1a_2$-1-1)

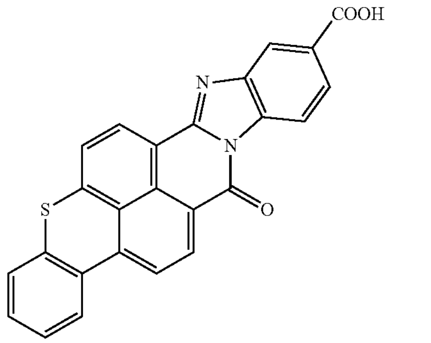

($1a_2$-1-2)

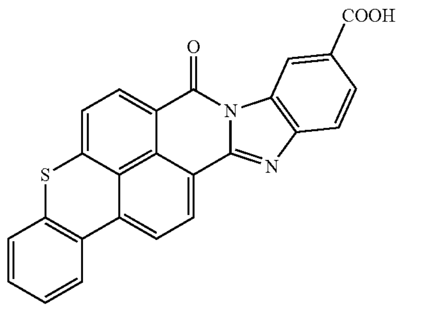

($1a_2$-1-3)

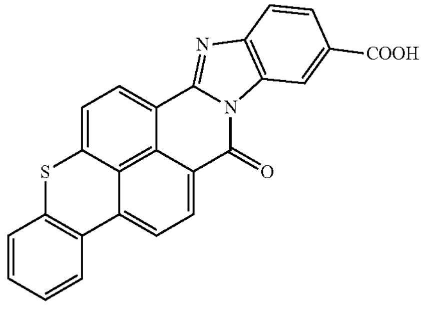

-continued ($1a_2$-1-4)

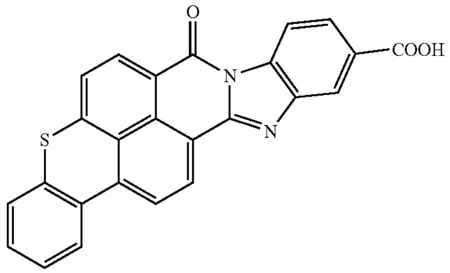

Another specific example of the benzimidazole ring-containing fused ring compound represented by the chemical formula ($1a_2$) is a compound represented by the following chemical formula ($1a_2$-2). This compound exhibits a yellowish orange color (orange-yellow).

[Chemical Formula 14]

($1a_2$-2)

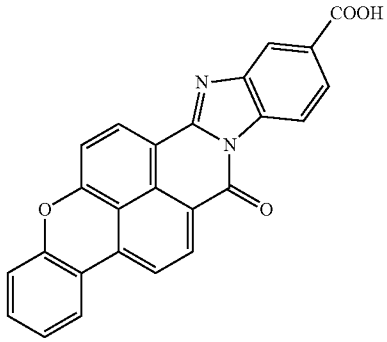

The benzimidazole ring-containing fused ring compound represented by the chemical formula ($1a_2$-2) has a xanthene structure in part of its structure. This benzimidazole ring-containing fused ring compound is obtained by reacting 2-nitrophenol with 4-bromonaphthalic anhydride to obtain a naphthalimide ether body, followed by a reduction reaction and a ring closure reaction to form a xanthene body and further reaction with 3,4-diaminobenzoic acid. This reaction produces four benzimidazole ring-containing fused ring compound isomers. The content ratio of the isomers is arbitrary. Any one compound of these isomers may be selectively produced, or a mixture of isomers may be produced, followed by separation of isomers with a column.

The pyrimidine ring-containing fused ring compound of the chemical formula (1b) exhibit red color. Specific example thereof is represented by the following chemical formula (1b-1).

[Chemical Formula 15]

(1b-1)

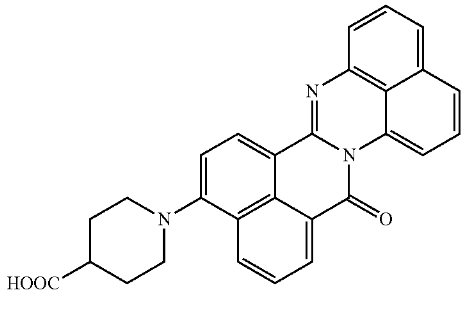

This pyrimidine ring-containing fused ring compound is obtained by reacting a naphthalic anhydride derivative with 4-piperidinecarboxylic acid, followed by a reaction with 1,8-diaminonaphthalene. This reaction produces two pyrimidine ring-containing fused ring compound isomers. The content ratio of the isomers is arbitrary. Any one compound of these isomers may be selectively produced, or a mixture of isomers may be produced, followed by separation of isomers with a column. The isomers comprehensively represented by the chemical formula (1b-1) are represented by the following chemical formulas (1b-1-1) and (1b-1-2)

[Chemical Formula 16]

(1b-1-1)

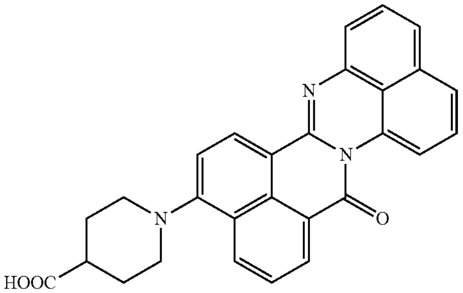

(1b-1-2)

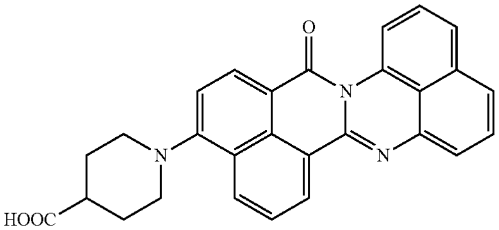

Other specific examples of the pyrimidine ring-containing fused ring compound represented by the chemical formula (1b) include those represented by the following chemical formulas (1b-2) to (1b-6).

[Chemical Formula 17]

(1b-2)

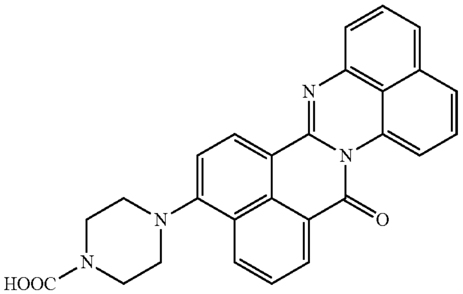

-continued (1b-3)

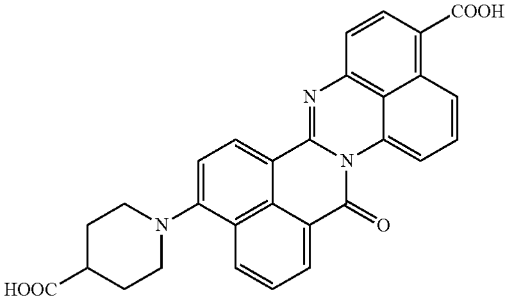

(1b-4)

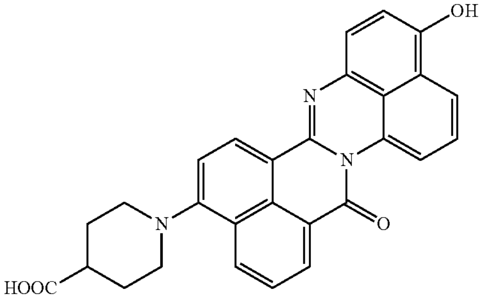

(1b-5)

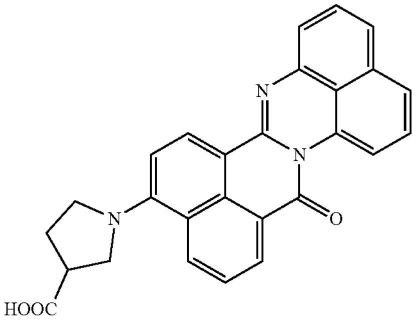

(1b-6)

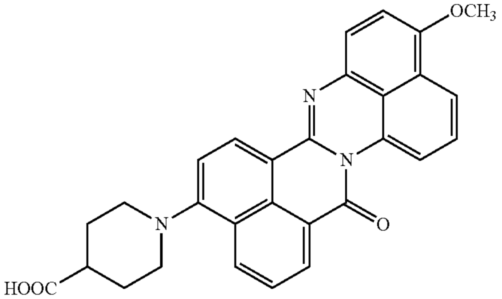

In the chemical formula (1b), when at least one of $R^4$ and $R^5$ is a nitrogen-containing heterocyclic group having a carboxy group, it is preferable that the pyrimidine ring-containing fused ring compound exhibits higher heat resistance and bleed resistance, and is also excellent in color developability.

The isoindolinone ring-containing fused ring compound represented by the chemical formula (1c) exhibits dark red to red color. Specific example thereof is represented by the following chemical formula (1c-1).

[Chemical Formula 18]

(1c-1)

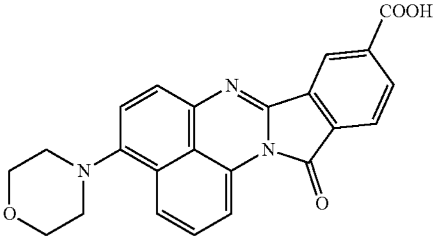

This isoindolinone ring-containing fused ring compound is obtained by reacting pyromellitic anhydride with 1,8-diamino-4-bromonaphthalene, followed by a reaction with morpholine. This reaction produces four isoindolinone ring-containing fused ring compound isomers. The content ratio of the isomers is arbitrary. Any one compound of these isomers may be selectively produced, or a mixture of isomers may be produced, followed by separation of isomers with a column.

In the reaction for producing an isoindolinone ring-containing fused ring compound represented by the chemical formula (1c), when a compound represented by the chemical formula (1c-1) in which $R^7$ and $R^8$ are not simultaneously hydrogen atoms is produced, isomers exist. One chemical formula (1c-1) also includes isomers represented by the following chemical formulas (1c-1-1) and (1c-1-2). Thus, for convenience, the structures of compounds included within the scope of the present invention are sometimes represented by one chemical formula comprehensively to omit chemical formulas of isomer structures.

[Chemical Formula 19]

(1c-1-1)

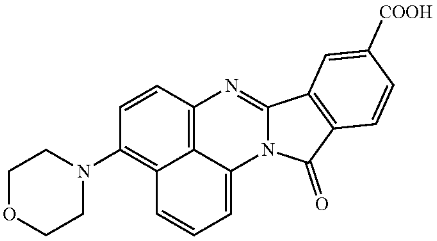

(1c-1-2)

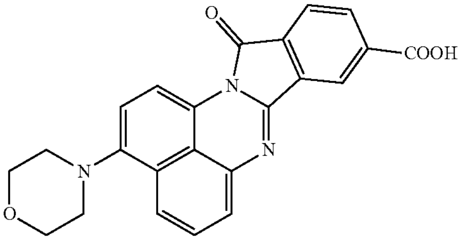

Other specific examples of the isoindolinone ring-containing fused ring compound represented by the chemical formula (1c) include those represented by the following chemical formulas (1c-2) to (1c-6).

[Chemical Formula 20]

(1c-2)

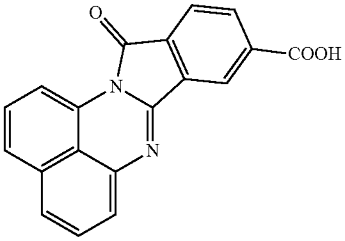

(1c-3)

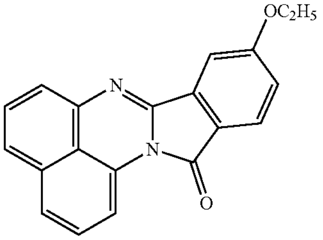

(1c-4)

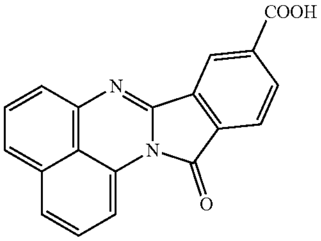

(1c-5)

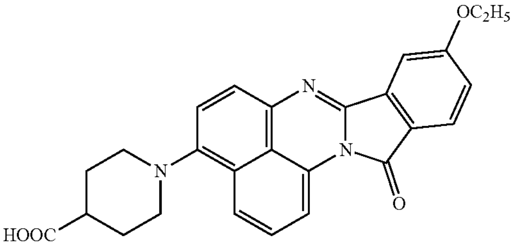

(1c-6)

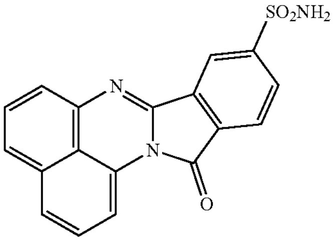

It is possible to use 5% heat weight loss temperature, as a value for evaluating the heat resistance of the compounds represented by the chemical formulas (1a) to (1c). This value is the temperature at which the weight of the compounds represented by the chemical formulas (1a) to (1c) decreases by 5% from the weight at the start of the measurement (room temperature) during the temperature rise process of thermogravimetric differential thermal analysis. The 5% heat weight loss temperature of the compounds represented by formulas (1a) to (1c) is at least 280° C., more preferably at least 300° C., and still more preferably at least 330° C.

The maximum absorption wavelength of the compounds represented by the chemical formulas (1a) to (1c) varies depending on the substituents they have, and is preferably 420 to 550 nm. This maximum absorption wavelength is measured under general conditions using an ultraviolet-visible spectrophotometer.

As the color used for coating materials of connectors or electric wires of high-voltage wire harnesses, orange colors represented by RAL2000, 2001, 2002, 2003, 2004, 2008, 2009, 2010, 2011 and 2012 in the RAL color chart are required. In this case, the hue expressed in the CIE-Lab color space is preferably L*=50 to 100, a*=20 to 85 and b*=30 to 120, more preferably L*=50 to 80, a*=35 to 55 and b*=30 to 85, and still more preferably L*=50 to 80, a*=35 to 55 and b*=30 to 80.

To obtain a colorant exhibiting the hue within this range, at least one of compounds represented by the chemical formulas (1a) to (1c) is preferably contained in the colorant in an amount of 1 to 100% by mass, more preferably 2 to 80% by mass, and still more preferably 2 to 50% by mass.

The orange color required for coating materials of high-voltage wire harnesses and the like differs depend on countries or regions. RAL2003 (L*=64.31, a*=43.85, b*=62.20), RAL2008 (L*=60.46, a*=46.57, b*=61.00), RAL2010 (L*=53.38, a*=42.56, b*=50.27) and RAL2012 (L*=56.08, a*=42.27, b*=34.37) in the RAL color chart are preferably used in the Europe, North America and Asia regions.

The compounds represented by the chemical formulas (1a) to (1c) are colorants exhibiting orange to reddish colors. Therefore, in order to obtain a colorant exhibiting orange color having desired hue, one of the compounds represented by the chemical formulas (1a) to (1c) may be used alone, or a mixture of a plurality of compounds may be used. When using a mixture of a plurality of compounds, a benzimidazole ring-containing fused ring compound represented by the chemical formula (1a), a pyrimidine ring-containing fused ring compound represented by the chemical formula (1b) and an isoindolinone ring-containing fused ring compound represented by the chemical formula (1c) may be respectively mixed with compounds having a common skeleton and differing only in substituent. Specifically, for example, in order to obtain the orange color of RAL2003, 2008, 2010 and 2012, colorant can be prepared by mixing a benzimidazole ring-containing fused ring compound represented by the chemical formula ($1a_1$-1) with a benzimidazole ring-containing fused ring compound represented by the chemical formula ($1a_2$-1). In this case, the first compound represented by the chemical formulas (1a) to (1c) and the second compound similarly represented by the chemical formulas (1a) to (1c) are preferably mixed in a mass ratio (first compound:second compound) of 1:4 to 4:1, and more preferably 1:2 to 2:1.

A white pigment may be included in the orange colorant to increase its brightness, and a black pigment may be included in the colorant to decrease the brightness, if necessary. Examples of the white pigment include inorganic pigments such as $CaCO_3$, $2PbCO_3—Pb(OH)_2$, ZnO, $TiO_2$ and ZnS. Examples of the black pigment include carbon-based pigments such as carbon black, graphite and amorphous carbon, and commercially available black pigments such as C.I. Pigment Black 6, 8, 9, 10, 11 and 28. Examples of the pigment other than white and black pigments include C.I. Pigment Orange 68, Sicopal (registered trademark) Orange K2430 (manufactured by BASF Corporation).

To adjust the orange color, the colorant of the present invention may contain other dyes and/or pigments, in addition to the compounds represented by the chemical formulas (1a) to (1c). Specific examples thereof include yellow dyes, orange dyes, red dyes, yellow pigments, orange pigments, red pigments, white pigments and black pigments. By mixing the compounds represented by the chemical formulas (1a) to (1c) exhibiting orange to red colors with these dyes and pigments, orange colorants exhibiting arbitrary hue and brightness can be obtained. Among them, a dye having fluorescence is preferable because it can increase the brightness of the resulting orange color, leading to an improvement in visibility.

Examples of the yellow dye include a naphthalimide compound represented by the following chemical formula (2):

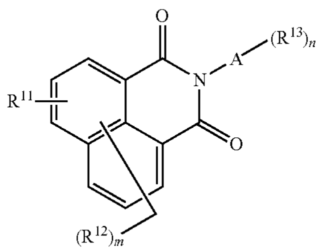

(2)

wherein, in the chemical formula (2), $R^{11}$ is a hydrogen atom, or an optionally substituted amino group or nitrogen-containing heterocyclic group, $R^{12}$ is at least one selected from a halogen atom, a straight or branched alkyl group having 1 to 3 carbon atoms, a straight or branched alkoxy group having 1 to 3 carbon atoms, and an optionally substituted amino group, $R^{13}$ is at least one selected from an amino group, an amide group, an alkoxy group, a carboxy group, a hydroxy group, a sulfo group and a sulfonamide group, A is a straight or branched hydrocarbon group having 1 to 3 carbon atoms, a benzene ring or a naphthalene ring, m is a number of 0 to 2, and n is a number of 1 to 3.

Examples of the nitrogen-containing heterocyclic group represented by $R^{11}$ in the chemical formula (2) include a morpholino group, a piperidinyl group, a pyrrolidinyl group and a piperazinyl group. When $R^{11}$ is an amino group, a piperidinyl group, a pyrrolidinyl group or a piperazinyl group, these groups may be substituted. Examples of this substituent include a straight or branched alkyl group having 1 to 4 carbon atoms, a straight or branched alkoxy group having 1 to 4 carbon atoms, a hydroxy group and a carboxy group. Examples of this alkyl group include a methyl group, an ethyl group, an n-propyl group, an isopropyl group, an n-butyl group, a sec-butyl group and a tert-butyl group, and examples of the alkoxy group include a methoxy group, an ethoxy group, an n-propoxy group, an isopropoxy group, an n-butoxy group, a sec-butoxy group and a tert-butoxy group.

Examples of the halogen atom represented by $R^{12}$ in the chemical formula (2) include F, Cl, Br and I, examples of the alkyl group include a methyl group, an ethyl group, an n-propyl group and an isopropyl group, and examples of the alkoxy group include a methoxy group, an ethoxy group, an n-propoxy group and an isopropoxy group.

When $R^{12}$ is an amino group, examples of the substituent possessed by the amino group include a straight or branched alkyl group having 1 to 4 carbon atoms, a straight or branched alkoxy group having 1 to 4 carbon atoms, a hydroxy group and a carboxy group. Examples of this alkyl group include a methyl group, an ethyl group, an n-propyl group, an isopropyl group, an n-butyl group, a sec-butyl group and a tert-butyl group, and examples of this alkoxy group include a methoxy group, an ethoxy group, an n-propoxy group, an isopropoxy group, an n-butoxy group, a sec-butoxy group and a tert-butoxy group. The substitution position of $R^{12}$ is not particularly limited. Further, m representing the number of substituents as for $R^{12}$ specifically includes integers of 0, 1 and 2, and is preferably 0, that is, $R^{12}$ is unsubstituted.

Specific examples of the straight or branched hydrocarbon group having 1 to 3 carbon atoms represented by A in the chemical formula (2) include alkylene groups such as a methylene group, an ethylene group, a trimethylene group and a propylene group. The benzene ring represented by A is a polyvalent group formed by eliminating one hydrogen atom of each of 2, 3 or 4 ring carbon atoms, and examples thereof include arylene groups such as a phenylene group. The naphthalene ring represented by A is a polyvalent group formed by eliminating one hydrogen atom of 2, 3, or 4 ring carbon atoms, and examples thereof include a naphthylene group. Examples of this naphthylene group include 1,2-naphthylene group, a 1,3-naphthylene group, a 1,4-naphthylene group, a 1,5-naphthylene group, a 1,6-naphthylene group, a 1,7-naphthylene group, a 1,8-naphthylene group, a 2,3-naphthylene group and a 2,6-naphthylene group.

A in the chemical formula (2) is more preferably a methylene group, an o-phenylene group, an m-phenylene group or a p-phenylene group, and still more preferably a p-phenylene group. The naphthalimide compound in which A is an arylene group has higher heat resistance. When A in the chemical formula (2) is an aromatic hydrocarbon group such as an arylene group or a naphthylene group, the substitution position of $R^{12}$ is not particularly limited.

Examples of the straight or branched alkoxy group having 1 to 4 carbon atoms represented by $R^{13}$ in the chemical formula (2) include a methoxy group, an ethoxy group, an n-propoxy group, an isopropoxy group, an n-butoxy group, a sec-butoxy group and a tert-butoxy group.

When $R^{13}$ is an amide group represented by "—C(═O)N$(R^{13a})_2$", it is preferable that a plurality of $R^{13a}$ are each independently a hydrogen atom, a straight or branched alkyl group having 1 to 4 carbon atoms, or a straight or branched alkoxy group having 1 to 4 carbon atoms. Examples of this alkyl group include a methyl group, an ethyl group, an n-propyl group, an isopropyl group, an n-butyl group, a sec-butyl group and a tert-butyl group, and examples of this alkoxy group include a methoxy group, an ethoxy group, an n-propoxy group, an isopropoxy group, an n-butoxy group, a sec-butoxy group and a tert-butoxy group. Meanwhile, when $R^{13}$ is an amide group represented by "—NHC(═O)$R^{13b}$", examples of $R^{13b}$ include the same as the above $R^{13a}$ When $R^{13}$ is a sulfonamide group represented by "—$SO_2N(R^{13c})_2$", it is preferable that a plurality of $R^{13a}$ are each independently a hydrogen atom, a straight or branched alkyl group having 1 to 4 carbon atoms, or a straight or branched alkoxy group having 1 to 4 carbon atoms. Examples of the alkyl group and alkoxy group as for $R^{13c}$ include the same as the above $R^{13a}$ Furthermore, $R^{13}$ is a sulfonamide group represented by "—$NH(SO)_2R^{13d}$", examples of this $R^{13d}$ include the same as the above $R^{13a}$. n representing the number of substituents as for $R^{13}$ is a number of 1 to 3, preferably 1 or 2, and more preferably 1.

Among them, a naphthalimide compound in which $R^{11}$ is a nitrogen-containing heterocyclic group, A is a phenylene group, m=0 (that is, $R^{12}$ is unsubstituted), and $R^{13}$ is a carboxy group is preferable that it exhibits higher heat resistance and bleed resistance, and is excellent in color developability and compatibility with the thermoplastic resin mentioned later. This is because the nitrogen-containing heterocyclic group as for $R^{11}$ acts as a chromophore and improves the heat resistance, the phenylene group as for A improves heat resistance, and the carboxy group as for $R^{13}$ imparts heat resistance and bleed resistance, respectively. Particularly when the thermoplastic resin is a polyamide resin, $R^{13}$ is more preferably a carboxy group. In this case, the bleed resistance is remarkably improved. This is because the amide group or carboxyl group in the polyamide resin molecule and the carboxyl group in the naphthalimide compound form an intermolecular hydrogen bond to suppress a bleed phenomenon.

The 5% heat weight loss temperature of the naphthalimide compound represented by the chemical formula (2) is at least 280° C., preferably at least 300° C., more preferably at least 330° C., and still more preferably at least 350° C. The 5% heat weight loss temperature is measured in the same manner as above.

The maximum absorption wavelength of visible light of the naphthalimide compound represented by the chemical formula (2) varies depending on the substituents which it has, and is preferably 385 to 439 nm. The maximum absorption wavelength is measured in the same manner as above.

Specific example of the naphthalimide compound represented by the chemical formula (2) is represented by the following chemical formula (2a).

[Chemical Formula 22]

(2a)

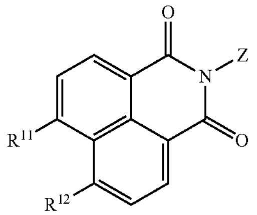

In the chemical formula (2a), the substituent Z collectively represents -A-$(R^{13})_n$ in the chemical formula (2). Examples of the respective substituents $R^{11}$, $R^{12}$ and Z in the chemical formula (2a) are shown in Tables 1 and 2.

TABLE 1

| Examples of compound | $R^{11}$ | $R^{12}$ | Z |
|---|---|---|---|
| 2-1 | 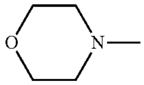 | H | 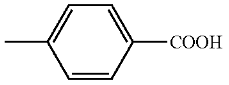 |
| 2-2 | 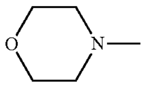 | H | 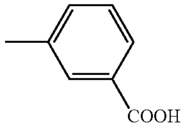 |

TABLE 1-continued
| Examples of compound | $R^{11}$ | $R^{12}$ | Z |
|---|---|---|---|
| 2-3 | 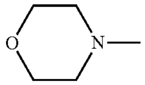 | H | 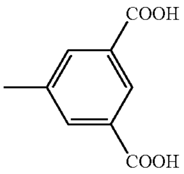 |
| 2-4 | 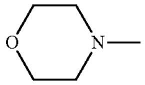 | H | 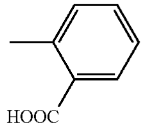 |
| 2-5 | 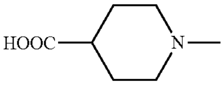 | H | 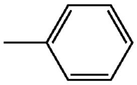 |
TABLE 1-continued
| Examples of compound | $R^{11}$ | $R^{12}$ | Z |
|---|---|---|---|
| 2-6 | 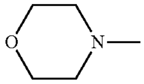 | H | $-CH_2-COOH$ |
| 2-7 | 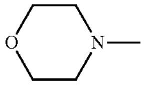 | H | 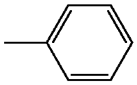 |
| 2-8 | $(H_3C)_2N-$ | H | 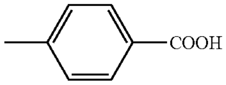 |
| 2-9 | 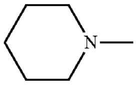 | H | 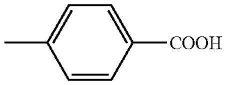 |
| 2-10 | 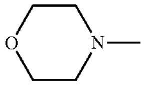 | Br | 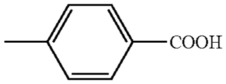 |
TABLE 2
| Examples of compound | $R^{11}$ | $R^{12}$ | Z |
|---|---|---|---|
| 2-11 | 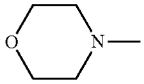 | H | 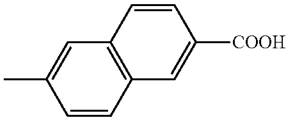 |
| 2-12 | 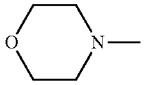 | H | $-CH_2CH_2-COOH$ |
| 2-13 | 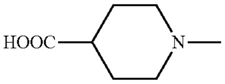 | H | 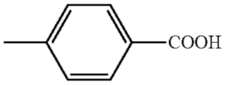 |
| 2-14 | 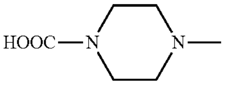 | H | 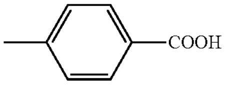 |
| 2-15 | 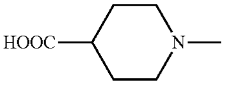 | H | 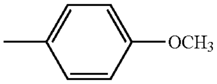 |
| 2-16 | 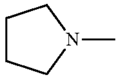 | H | 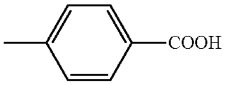 |
| 2-17 | 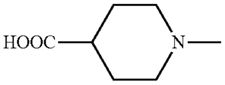 | H | 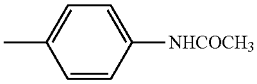 |
| 2-18 | 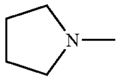 | H | 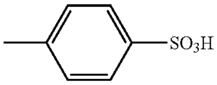 |

TABLE 2-continued

| Examples of compound | $R^{11}$ | $R^{12}$ | Z |
|---|---|---|---|
| 2-19 | 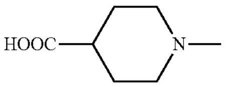 | H | 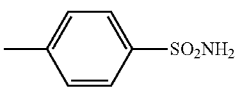 |

The colorant may be prepared by combining at least one of the compounds represented by the chemical formulas (1a) to (1c) with dyes or pigments other than the above compounds. Thereby, a colorant exhibiting various colors can be obtained. Examples thereof include orange (for example, a combination of any of compounds represented by the chemical formulas (1a) to (1c) with a yellow to red dye or pigment), green (for example, a combination of any of compounds represented by the chemical formulas (1a) to (1c) with a blue dye or pigment), purple (for example, a combination of any of compounds represented by the chemical formulas (1a) to (1c) with a blue dye or pigment), and black (for example, a combination of any of compounds represented by the chemical formulas (1a) to (1c) with a blue dye or pigment and a yellow dye or pigment, or, for example, a combination of any of compounds represented by the chemical formulas (1a) to (1c) with a blue dye or pigment). Industrially, especially orange and black colorants are often used.

Dyes and pigments which do not impair the effects of the invention are selected as dyes and pigments used in the preparation. Examples of preferred dyes and pigments include at least one organic pigment selected from the group consisting of azo-based dyes and pigments, azo-based metal-containing dyes and pigments, naphtholazo-based dyes and pigments, azo lake-based dyes and pigments, azomethine-based dyes and pigments, anthraquinone-based dyes and pigments, quinacridone-based dyes and pigments, dioxazine-based dyes and pigments, diketopyrrolopyrrole-based dyes and pigments, anthrapyridone-based dyes and pigments, isoindolinone-based dyes and pigments, indanthrone-based dyes and pigments, perinone-based dyes and pigments, perylene-based dyes and pigments, indigo-based dyes and pigments, thio indigo-based dyes and pigments, quinoline-based dyes and pigments, benzimidazolone-based dyes and pigments, and triphenylmethane-based dyes and pigments. The dyes and pigments exhibit yellow, red, blue, green or black color.

Examples of the red dye include ORIENT LPI-1 (maximum absorption wavelength: 560 nm), which is an azine-based dye manufactured by Orient Chemical Industries Co., Ltd.

When the colorant contains the above pigments and/or dyes, the amount is preferably 0.01 to 50 parts by mass, more preferably 0.1 to 40 parts by mass, and still more preferably 0.5 to 20 parts by mass, based on 1 part by mass of the compounds represented by the chemical formulas (1a) to (1c).

Master Batch

The master batch of the present invention contains at least one of compounds represented by the chemical formulas (1a) to (1c) and, if necessary, any dyes and/or pigments, and a thermoplastic resin. The master batch may be those containing a mixed colorant in which at least one of compounds represented by the chemical formulas (1a) to (1c) and any dyes and/or pigments are mixed, and a thermoplastic resin. This thermoplastic resin may be the same as or different from a main component resin (uncolored resin) used in this colored resin composition. Specific examples of the colorant include those containing a dye represented by the chemical formula (2) and the above pigments.

The content of the colorant in the master batch is preferably 5 to 30% by mass, more preferably 5 to 25% by mass, and still more preferably 5 to 20% by mass.

Examples of the step of producing a master batch include a high-temperature extrusion treatment and the like. The colorant containing at least one of compounds represented by the chemical formulas (1a) to (1c) and any dyes and/or pigments according to the present invention is less likely to cause decomposition, sublimation and discoloration due to high temperature. Therefore, a colorant composed of at least one of compounds represented by the chemical formulas (1a) to (1c) and a colorant containing them and an any dyes and/or pigments can be suitably used for the master batch (high-concentration colored resin composition).

Such master batch can be obtained by the following heat melting method. Powders or pellets of a thermoplastic resin as the base of the master batch, the colorant of the present invention and, if necessary, additives are mixed in a tumbler or a super mixer, and then the mixture is pelletized or granulated after putting in an extruder, a batch-type kneader or a roll-type kneader. Thus, the master batch can be obtained. The master batch can also be obtained, for example, by adding the colorant of the present invention and, if necessary, other additives to a thermoplastic resin that is still in a solution state after synthesis, followed by removal of the solvent. By treating in the same manner, a colored resin composition having a normal concentration mentioned later can be obtained.

It is possible to use, as the thermoplastic resin, a known or commercially available one. Examples thereof include polyamide resins, polyolefin resins such as polyethylene and polypropylene, polyester resins, polycarbonate resins, and polyphenylene sulfide resins.

The polyamide resin is a polyamide polymer which has an acid amide group (—CONH—) in the molecule and can be heat-melted. It is preferable that a polyamide resin containing, as a structural unit, at least one selected from salts of an aliphatic diamine and an aromatic dicarboxylic acid and salts of an aromatic diamine and an aliphatic dicarboxylic acid. Examples of the polyamide resin include polyamide 6, polyamide 66, polyamide 46, polyamide 11, polyamide 12, polyamide 69, polyamide 610, polyamide 612, polyamide 96, amorphous polyamide, high melting point polyamide, polyamide RIM, polyamide 4, polyamide 61, Polyamide 56, polyamide 6T, polyamide 9T, polyamide MXD6, polyamide MP6, polyamide MP10, and copolymers of two or more thereof. Specific examples of this copolymer include polyamide 6/66 copolymer, polyamide 6/66/610 copolymer, polyamide 6/66/11/12 copolymer, crystalline polyamide/amorphous polyamide copolymer and the like. The polyamide resin may also be a mixed polymer of the polyamide resin and other synthetic resin. Examples of such mixed polymers include polyamide/polyester mixed polymer, polyamide/polyphenylene oxide mixed polymer, polyamide/polycarbonate mixed polymer, polyamide/polyolefin mixed polymer, polyamide/styrene/acrylonitrile mixed polymer, polyamide/acrylic acid ester mixed polymer, polyamide/silicone mixed polymer and the like. These polyamide resins may be used alone or in combination of two or more thereof.

Examples of the polyolefin resin include homopolymers and copolymers of α-olefins such as ethylene, propylene, butene-1, 3-methylbutene-1,4-methylpentene-1 and octene-1, and copolymers of these polymers with other copolymerizable unsaturated monomers (copolymers include block copolymers, random copolymers and graft copolymers) and the like. More specific examples thereof include polyethylene-based resins such as high-density polyethylene, medium-density polyethylene, low-density polyethylene, linear low-density polyethylene, ethylene-vinyl acetate copolymer and ethylene-ethyl acrylate copolymer; polypropylene-based resins such as propylene homopolymer, propylene-ethylene block copolymer or random copolymer, and propylene-ethylene-butene-1 copolymer; polybutene-1, poly-4-methylpentene-1 and the like. These polyolefin resins may be used alone or in combination of two or more thereof. Among them, the polyethylene resin and/or the polypropylene resin are preferably used. Polypropylene-based resins are more preferred. The molecular weight of this polypropylene-based resin is not particularly limited, and those having a wide range of molecular weights can be used.

Examples of the polyester resin include a polyethylene terephthalate resin obtained by a polycondensation reaction of terephthalic acid and ethylene glycol, and a polybutylene terephthalate resin obtained by a polycondensation reaction of terephthalic acid and butylene glycol. Examples of the other polyester resin include copolymers in which part of a terephthalic acid component or a glycol component, for example, 15 mol % or less (e.g., 0.5 to 15 mol %), and preferably 5 mol % or less (e.g., 0.5 to 5 mol %) in the terephthalic acid component, and/or 15 mol % or less (e.g., 0.5 to 15 mol %), and preferably 5 mol % or less (e.g., 0.5 to 5 mol %) in the glycol component such as ethylene glycol or butylene glycol, is substituted with a substituent such as an alkyl group having 1 to 4 carbon atoms. Further, the polyester resins may be used alone or in combination of a plurality thereof.

The polycarbonate resin is a thermoplastic resin having a carbonate ester bond in the main chain, and has bulky benzene nucleus and flexible carbonate in the molecular main chain, in a straight chain molecule in which carbonate esters of aromatic hydrocarbons are bonded. Examples of the industrially mass-produced polycarbonate resin include aromatic polycarbonate obtained from bisphenol A, which can be used.

The polyphenylene sulfide resin is a polymer which mainly comprises repeating units composed of a thiophenylene group represented by (-φ-S—) [φ is a substituted or unsubstituted phenylene group]. It is possible to use, as the polyphenylene sulfide resin, those obtained by polymerizing a monomer synthesized by reacting paradichlorobenzene with alkali sulfide at high temperature under high pressure.

Colored Resin Composition

The colored resin composition of the present invention is a mixture of the above master batch and uncolored resin. The content of the master batch in the colored resin composition is preferably 0.1 to 40% by mass, more preferably 0.5 to 20% by mass, and still more preferably 1 to 10% by mass. The colored resin composition is obtained by mixing the colorant of the present invention and/or the master batch of the present invention, the uncolored resin and, if necessary, additives mentioned later in a tumbler or a super mixer and the like, and then the mixture is pelletized or granulated by a heat melting method using an extruder, a batch-type kneader or a roll-type kneader. Such colored resin composition is also called a compound, and is a raw material for molding a molded article of a resin. A uniformly colored resin molded article can be obtained by molding the colored resin composition by a conventional method.

Examples of the uncolored resin include the same thermoplastic resin as used in the master batch. The colored resin composition may contain the colorant as the master batch and the uncolored resin, and further additives, if necessary. Examples of such additives include reinforcing materials, ultraviolet absorbers, light stabilizers, flame retardants, auxiliary flame retardant, antioxidants, brightness modifiers, lubricants and release agents.

The reinforcing material is not particularly limited as long as it can be used to reinforce the thermoplastic resin. Examples thereof include inorganic fibers such as glass fiber, carbon fiber, metal fiber, potassium titanate fiber, calcium silicate fiber, sepiolite, wollastonite and rock wool; and organic fibers such as aramid, polyphenylene sulfide resin fiber, polyamide resin fiber, polyester resin fiber and liquid crystal polymer resin fiber. Among them, glass fiber can be preferably used. Such glass fiber has a fiber length of 2 to 15 mm and a fiber diameter of 1 to 20 m. The form of the glass fiber is not particularly limited, and examples thereof include roving and milled fiber. These glass fibers may be used alone or in combination of two or more thereof. The content thereof is preferably 5 to 120 parts by mass based on 100 parts by mass in total of the colorant and the uncolored resin. If the content is less than 5 parts by mass, a sufficient glass fiber reinforcing effect cannot be obtained, and if the content exceeds 120 parts by mass, the moldability deteriorates. The content is preferably 10 to 60 parts by mass, and particularly preferably 20 to 50 parts by mass. A commercially available glass fiber-containing uncolored resin may be used, and the glass fiber may be added to the uncolored resin each time the colored resin composition is prepared.

Examples of the ultraviolet absorber and light stabilizer include benzotriazole-based compounds, benzophenone-based compounds, salicylate-based compounds, cyanoacrylate-based compounds, benzoate-based compounds, oxanilide compound-based compounds, hindered amine-based compounds and nickel complex salts.

The flame retardant is preferably used to prevent ignition of the molded article exposed to high temperature, like connector housings for automotive wiring harnesses. Examples of the flame retardant include chlorine-based flame retardants, bromine-based flame retardants, antimony-based flame retardants, phosphorus-based flame retardants, silicon-based flame retardants and nitrogen-based flame retardants.

Examples of the chlorine-based flame retardant include chlorinated paraffin, chlorinated polyolefins such as chlorinated polyethylene and polyethylene which is chlorinated, dodecachloropentacyclooctadeca-7,15-diene and chlorendic anhydride.

Examples of the bromine-based flame retardant include tetrabromobisphenol A (TBBA), tetrabromobisphenol S (TBBS), hexabromocyclododecane, decabromodiphenyl ether, decabromodiphenyl oxide, 2,6-dibromophenol, 2,4-dibromophenol 2,4,6-tribromophenol, ethylenebis(tetrabromophthalimide), TBBA-carbonate oligomer, TBBA-epoxy oligomer, bis(pentabromophenoxy)ethane, 1,2-bis(2,4,6-pentabromophenoxy)ethane, 2,4,6-tris(2,4,6-tribromophenoxy)-1,3,5-triazine, bis(pentabromphenyl)ethane, octabromodiphenyl oxide, ethylenebispentabromodiphenyl, TBBA-bis(dibromopropyl ether), TBBA-bis(aryl ether), poly (dibromophenol), hexabromobenzene, polybromotrimethylphenylindane, ethylenebistetrabromophthalimide, tris(2,4,6-tribromophenyl) cyanurate, TBBA-bis(dibromopropyl), TBBS-bis(dibromopropyl), brominated polystyrene resin, brominated epoxy resin, brominated phenoxy resin, brominated styrene-maleic anhydride polymer, brominated polyphenylene ether, tris[3-bromo-2,2-bis(bromomethyl)propyl] phosphate and pentabromobenzyl acrylate.

Examples of the antimony-based flame retardant include antimony trioxide, antimony pentoxide, sodium antimonate and antimony phosphate.

Examples of the phosphorus-based flame retardant include red phosphorus, polyphosphoric acid, ammonium polyphosphate, phenoxyphosphazene having a bond between a phosphorus atom and a nitrogen atom in the main chain, aminophosphazene, triphenylphosphate, triethylphosphate, tributylphosphate, trioctylphosphate, cresyl phosphate, cresyl diphenyl phosphate, xylenyl diphenyl phosphate, tricresyl phosphate, trixylenyl phosphate, tris(tert-butylated phenyl)phosphate, tris(isobutylated phenyl) phosphate, 2-ethylhexyl diphenyl phosphate, 1,3-phenylenebis(diphenylphosphate), 1,3-phenylenebis(dixylenylphosphate), TBBA-bis(diphenylphosphate), tris(butoxyethyl) phosphate, tris(chloroethyl)phosphate, tris(dichloropropyl) phosphate, tris(O-chloropropyl)phosphate, 2,2-bis (chloromethyl)trimethylenebis(bis(2-chloroethyl) phosphate), bis(nonylphenyl)phenylphosphate, cresylbis (di2,6-xylenyl)phosphates and polyoxyalkylene bisdichloroalkyl phosphate.

Examples of the silicon-based flame retardant include silicone oil, organosilane and aluminum silicate.

Examples of the nitrogen-based flame retardant include melamine, cyanuric acid, melamine cyanurate, urea and guanidine.

The above flame retardants may be used alone or in combination of a plurality thereof. The content of the flame retardant is preferably 1 to 30 parts by mass, more preferably 5 to 25 parts by mass, and particularly preferably 10 to 20 parts by mass, for example, based on 100 parts by mass in total of the colorant and the uncolored resin.

Since halogen-based flame retardants such as the chlorine-based flame retardants and the bromine-based flame retardants may generate toxic gases when burned in the case of incinerating thermoplastic resin products containing them, non-halogen flame retardants such as the phosphorus-based flame retardants and the nitrogen-based flame retardants are often used. The benzimidazole ring-containing fused ring compound, the pyrimidine ring-containing fused ring compound, and/or the isoindolinone ring-containing fused ring compound contained in the colorant of the present invention cause neither discoloration nor fading that occurs in general dyes and pigments contained in conventional colorants, and cause neither discoloration nor fading that occurs due to non-halogen-based flame retardants in high-temperature environments. Therefore, the colorant of the present invention is suitable as a colorant for a non-halogenated flame retardant grade resin containing a non-halogen-based flame retardant.

Examples of the auxiliary flame retardant include antimony compounds such as diantimony trioxide and sodium antimonate, zinc borate, barium metaborate, alumina hydrate, zirconium oxide, ammonium polyphosphate and tin oxide.

Examples of the antioxidant include phenol-based compounds having a phenolic hydroxyl group, phosphorus-based compounds having a phosphorus atom, and sulfur-based and thioether-based compounds each having a sulfur atom.

Examples of the phosphorus-based compound include triphenyl phosphite, diphenyldecyl phosphite, phenyldiisodecyl phosphite, tri(nonylphenyl) phosphite, bis(2,4-di-tert-butylphenyl)pentaerythritol diphosphite and bis(2,6-di-tert-butyl-4-methylphenyl)pentaerythritol diphosphite.

Examples of the sulfur-based compounds and thioether-based compound include didodecyl thiodipropionate, ditetradecyl thiodipropionate, dioctadecyl thiodipropionate, pentaerythritol tetrakis(3-dodecylthiopropionate), thiobis(N-phenyl-β-naphthylamine), 2-mercaptobenzothiazole, 2-mercaptobenzimidazole, tetramethylthiuram monosulfide, tetramethylthiuram disulfide, nickel dibutyldithiocarbamate, nickel isopropylxanthate and trilauryltrithiophosphite.

The brightness modifier is used to reduce the transparency of molded articles made of the resin compositions so that metal electrical contacts built into connectors of high-voltage wire harnesses and wires in wire coating materials cannot be seen from the outside. Examples of the brightness adjuster include titanium oxide, zinc oxide, zinc sulfide, barium sulfate, lithopone (mixture of zinc sulfide and barium sulfate), calcium carbonate, silica, carbon black, titanium black, red iron oxide, ultramarine, cobalt aluminate and chrome green.

Examples of the lubricant include hydrocarbon-based lubricants such as polyethylene wax and polypropylene wax; fatty acid-based lubricants such as stearic acid; higher alcohol-based lubricants such as stearyl alcohol; and aliphatic amide-based lubricants such as stearic acid amide; and metal soaps such as calcium stearate, zinc stearate and magnesium stearate.

Examples of the release agent include long-chain fatty acids or esters thereof and metal salts, aliphatic carboxylic acids, polyethylene waxes, and silicones.

Molded Article

The molded article of the present invention is made of the above colored resin composition. The molded article is, for example, connector housings for high-voltage wire harnesses in automobiles such as HVs and EVs. The connector housing is a housing that covers metal parts for connecting electric wires to each other or to an electric device such as a battery. The molded article can be produced by a variety of commonly practiced procedures. For example, the colored resin composition is melted, and it is possible to employ molding methods such as injection molding, extrusion molding, compression molding, foam molding, blow molding, vacuum molding, injection blow molding, rotational molding, calendar molding and solution casing methods. Molded articles of various shapes can be obtained by such molding.

While the connector for high-voltage wire harnesses was mentioned as an example of the molded article, the molded article is not limited thereto. For example, an electric wire covering material is exemplified as parts for wire harnesses. Examples of other molded article include laser-welded parts manufactured by laser-welding a plurality of members, such as intake manifolds and engine covers for internal combustion engines. Since the colorant of the present invention is excellent in light resistance in addition to heat resistance and bleed resistance, it is suitably used for molded articles used outdoors. Examples of the molded article further include medical tubes used for drip infusions and nutritional supplements, food packaging materials such as spout pouches containing liquid foods and beverage compositions, and caps or labels for PET bottles.

EXAMPLES

The present invention will be described in detail below by way of Examples, but the present invention is not limited to these Examples.

Synthesis Example 1

In a 100 ml four-necked flask, 14.79 g of 4-bromonaphthalic anhydride (0.053 mol, manufactured by Tokyo Kasei Kogyo Co., Ltd.) and 30 ml of N-methyl-2-pyrrolidone (NMP) were charged, followed by stirring. To this solution, 9.76 g of morpholine (0.112 mol, manufactured by FUJIFILM Wako Pure Chemical Corporation) was added, followed by stirring at 120° C. for 2 hours. To this solution, 8.12 g of 3,4-diaminobenzoic acid (0.053 mol, manufactured by FUJIFILM Wako Pure Chemical Corporation) was added, followed by further stirring at 120° C. for 20 hours. After cooling to room temperature, 50 ml of methanol was added dropwise and dispersed for 1 hour. The dispersion thus obtained was transferred to a 500 ml beaker, and 200 ml of methanol was added and dispersed for 12 hours. Thereafter, the precipitate of the dispersion was filtered and then washed with 150 ml of methanol and 200 ml of ion-exchange water. The wet cake thus obtained was dried in a normal pressure dryer at 80° C. for 20 hours to obtain 19.06 g of an orange solid as a benzimidazole ring-containing fused ring compound represented by the following chemical formula ($1a_1$-1) (in a yield of 90.0%).

The orange solid thus obtained was subjected to measurement using an elemental analyzer (manufactured by PerkinElmer Japan Co., Ltd., product name: EA 240011 fully automated elemental analyzer). The results are shown below. These results revealed that the benzimidazole ring-containing fused ring compound thus obtained has a structure of the following chemical formula ($1a_1$-1).

[Chemical Formula 23]

($1a_1$-1)

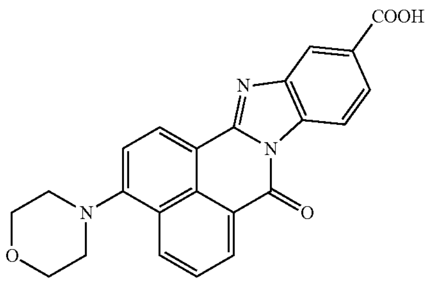

Elemental Analysis Values
Measured values C: 68.98%, H: 4.20%, N: 10.45%
Theoretical values C: 69.17%, H: 4.29%, N: 10.52%

Synthesis Example 2

In a 500 ml four-necked flask, 13.27 g of potassium carbonate (0.096 mol, manufactured by FUJIFILM Wako Pure Chemical Corporation) and 53.2 g of 4-bromonaphthalic anhydride (0.192 mol, manufactured by FUJIFILM Wako Pure Chemical Corporation), 96 g of isopropanol and 144 g of sulfolane were charged, followed by stirring for a while at room temperature until they were completely dissolved. After raising the temperature to 50° C., 26.44 g of 2-aminobenzenethiol (0.211 mol, manufactured by Tokyo Kasei Kogyo Co., Ltd.) was added dropwise. After completion of the dropwise addition, the temperature was raised to 90° C. and a reaction was performed for 12 hours. After cooling to 15° C. or lower, the reaction solution was filtered to obtain 81 g of a wet cake. This wet cake was added to 120 ml of ion-exchange water, followed by temperature rise to 40° C. and further dispersion for 2 hours. After cooling to room temperature, the dispersion was filtered and then washed with 1,000 ml of ion-exchange water. Then, 63.8 g of the wet cake thus obtained was dried in a vacuum dryer at 80° C. for 16 hours to obtain 43.15 g of an ocher solid as a naphthal thioether compound represented by the following chemical formula ($1a_2$-1').

[Chemical Formula 24]

($1a_2$-1')

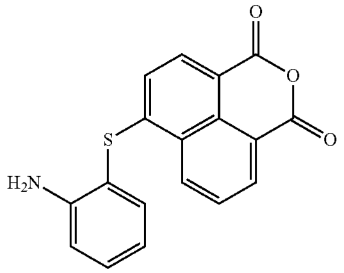

In a 1,000 ml separable flask, 38.6 g (0.12 mol) of the naphthalimide thioether compound represented by the chemical formula ($1a_2$-1') and 579 g of DMF were charged, followed by cooling to 15° C. or lower while stirring. Thereafter, 96 g (0.92 mol) of 35% by mass hydrochloric acid was gradually added dropwise thereto while maintaining the temperature at 15° C. or lower. After completion of the dropwise addition, the mixture was further cooled to 5° C. or lower in an ice bath. Then, 21 g (0.12 mol) of an aqueous 40% by mass sodium nitrite solution was added dropwise while maintaining the temperature at 5° C. or lower, followed by stirring for 2 hours. Thereafter, the temperature was raised to 100° C. and a reaction was performed for 2 hours, and then the reaction solution was allowed to cool to room temperature and filtered to obtain a wet cake. This wet cake was charged in a 300 ml beaker, and 150 ml of ion-exchanged water was added thereto, followed by dispersion for 30 minutes. After dispersion, the dispersion was filtered and then washed with 2,000 ml of ion-exchange water. This wet cake was dried in a vacuum dryer at 80° C. for 16 hours to obtain 30.12 g of an orange solid as a thioxanthene ring-containing fused ring compound represented by the following chemical formula ($1a_2$-1").

[Chemical Formula 24]

(1a$_2$-1")

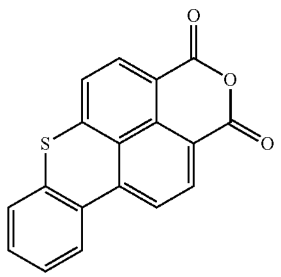

In a 500 ml four-necked flask, 27.4 g (0.09 mol) of the thioxanthene ring-containing fused ring compound represented by the chemical formula (1a$_2$-1") and 195 g of N-methyl 2-pyrrolidone were charged, followed by temperature rise to 120° C. To the mixture, 13.7 g (0.09 mol, manufactured by FUJIFILM Wako Pure Chemical Corporation) of 3,4-diaminobenzoic acid was added, followed by stirring for 24 hours. The reaction solution was subjected to hot filtration and then washed sequentially with 800 ml of DMF at 100° C., 500 ml of methanol and 100 ml of ion-exchange water. Then, 101 g of the wet cake thus obtained was dried in a vacuum dryer at 80° C. for 15 hours to obtain 32.05 g of a red solid as a benzimidazole ring-containing fused ring compound containing a thioxanthene ring represented by the following chemical formula (1a$_2$-1) (in a yield of 84.7%).

[Chemical Formula 26]

(1a$_2$-1)

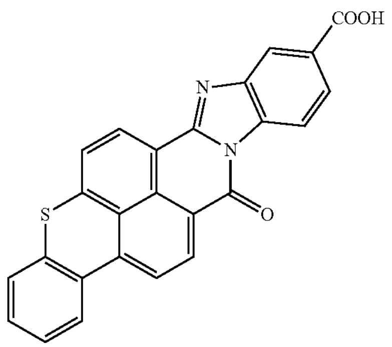

Synthesis Example 3

In a 100 ml four-necked flask, 13.3 g of 4-bromonaphthalic anhydride (0.048 mol, manufactured by Tokyo Kasei Kogyo Co., Ltd.) and 30 ml of NMP were charged, followed by stirring. To this solution, 6.51 g of 4-piperidinecarboxylic acid (0.050 mol, manufactured by Tokyo Kasei Kogyo Co., Ltd.) and 9.34 g of tributylamine (0.05 mol, manufactured by FUJIFILM Wako Pure Chemical Corporation) were added, followed by temperature rise to 120° C. A reaction was performed at 120° C. for 5 hours. To this solution, 8.35 g of 1,8-diaminonaphthalene (0.053 mol, manufactured by Tokyo Kasei Kogyo Co., Ltd.) was added and a reaction was performed at 120° C. for 6 hours. After 6 hours, the reaction solution was cooled until the solution temperature became 65° C. and 50 ml of methanol was added dropwise to the reaction solution, followed by dispersion for 1 hour. The dispersion thus obtained was transferred to a 500 ml beaker and 200 ml of methanol was added thereto, followed by further dispersion overnight. Thereafter, the precipitate of the dispersion was filtered and then washed with 200 ml of methanol and 200 ml of ion-exchange water. The wet cake thus obtained was dried in a normal pressure dryer at 80° C. for 40 hours to obtain 17.72 g of a dark red solid as a pyrimidine ring-containing fused ring compound represented by the following formula (1b-1) (in a yield of 82.5%).

[Chemical Formula 27]

(1b-1)

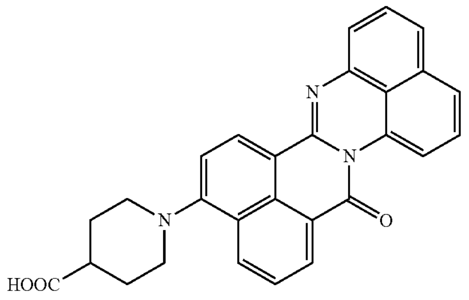

Synthesis Example 4

In a 300 ml four-necked flask, 9.49 g of 1,8-diaminonaphthalene (0.06 mol, manufactured by FUJIFILM Wako Pure Chemical Corporation) and 11.53 g of trimellitic anhydride (0.06 mol, manufactured by FUJIFILM Wako Pure Chemical Corporation) were charged and 75 ml of NMP was added thereto, followed by temperature rise to 120° C. and further stirring for 4 hours. After 4 hours, the mixture was cooled to room temperature. The dispersion thus obtained was transferred to a 500 ml beaker and 200 ml of methanol was added, followed by dispersion for 12 hours. Thereafter, the precipitate of the dispersion was filtered and then washed with 150 ml of methanol and 300 ml of ion-exchange water heated to 60° C. The wet cake thus obtained was dried in a normal pressure dryer at 80° C. for 20 hours to obtain 15.33 g of a dark red solid as an isoindolinone ring-containing fused ring compound represented by the following formula (1c-2) (in a yield of 81.3%).

[Chemical Formula 28]

(1c-2)

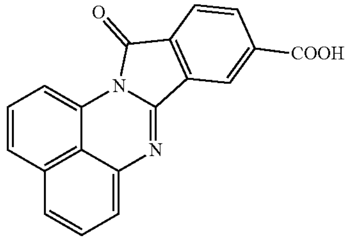

Evaluation of Heat Resistance

The compounds obtained in Synthesis Examples 1 to 4 were subjected to measurement under temperature elevation conditions of 30° C. to 550° C. at a heating rate of 10° C./min using Simultaneous Thermogravimetry Differential Thermal Analyzer (TG-DTA6200 EXSTAR6000, manufactured by Hitachi High-Tech Science Corporation). The temperature at which the weight decreased by 5% from the initial sample weight was read from the chart. For comparison, the 5% weight loss temperature of commercially available C.I. Solvent Orange 60 was also measured. The results are shown in Table 3.

[Chemical Formula 29]

C.I.Solvent Orange 60

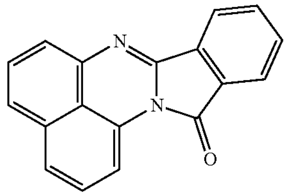

TABLE 3

| | Synthesis Example | | | | |
|---|---|---|---|---|---|
| | 1 | 2 | 3 | 4 | |
| | Compound | | | | C.I. Solvent |
| | $(1a_1\text{-}1)$ | $(1a_2\text{-}1)$ | (1b-1) | (1c-2) | Orange 60 |
| 5% Weight loss temperature (° C.) | 354.0 | 412.2 | 305.3 | 321.4 | 252.4 |

As shown in Table 3, all of the compounds of Synthetic Examples contained in the colorants of the present invention exhibited higher as 5% weight loss temperature compared to C.I. Solvent Orange 60. Therefore, all the compounds represented by the chemical formulas (1a), (1b) and (1c) have high heat resistance and cause neither discoloration nor fading even when exposed to high temperature conditions.

Example 1-1

In a stainless steel tumbler, 499.5 g of a polyamide 66 resin (manufactured by DuPont, product name: Zytel (registered trademark) 70G33L) and 0.5 g of the benzimidazole ring-containing fused ring compound obtained in Synthesis Example 1 were charged, followed by mixing with stirring for 1 hour to prepare a colored resin composition. This colored resin composition was charged in an injection molding machine (manufactured by Toyo Machinery & Metal Co., LTD., product name: Si-50) and then injection molded at a cylinder temperature of 290° C. and a mold temperature of 80° C. Thus, one molded article having a 1 mm thick portion was fabricated. The appearance and surface gloss of this molded article were satisfactory, and exhibited uniform orange color without color unevenness.

Example 1-2

In the same manner as in Example 1-1, except that the colored resin composition prepared in Example 1-1 was allowed to retain in the cylinder of the injection molding machine for 3 minutes after being charged in the injection molding machine, and then injection-molded, the operation was performed to fabricate one molded article of Example 1-2.

Evaluation of Heat Retention Resistance of Molded Article

Using a spectral colorimeter (manufactured by Nippon Denshoku Industries Co., Ltd., product name: SD7000), the hues of the molded articles of Example 1-1 and Example 1-2 were respectively measured. The measurement potion of the molded articles was regarded as the 1 mm thick portion. The measurement conditions were as follows: light source: D65, φ25.4 mm, viewing angle: 10 degrees, specular reflected light excluded, presser: standard white plate (manufactured by Suga Test Instruments Co., Ltd.). ΔL*, Δa* and Δb* were determined by taking the change in each of the L, a and b values obtained by measuring the molded article of Example 1-2 from the L, a and b values obtained by measuring the molded article of Example 1-1. These values were substituted into the following formula to obtain a color difference ΔE.

$$\Delta E=[(\Delta L^*)^2+(\Delta a^*)^2+(\Delta b^*)^2]^{1/2}$$

As a result, ΔE=2.23.

Evaluation of Sealing Properties

Using two types of pressers of a standard black plate and a standard white plate (both manufactured by Suga Test Instruments Co., Ltd.), the operation was performed in the same manner as in the above hue evaluation, and then the same plate as in the molded article of Example 1-1 was used to measure the sealing properties. The white plate had L*=73.68 and the black plate had L*=73.31. The L* value obtained in the above hue evaluation was used as the white plate L*, and this value and the black plate L* were substituted into the following formula to obtain the sealing rate.

$$\text{Sealing rate}[\%]=[(\text{black plate } L^*)/(\text{white plate } L^*)]\times 100$$

The sealing rate was 99.5%.

Evaluation of Bleed Resistance

The molded article of Example 1-1 and a contacted white piece made of the same resin were laid one upon another, and the two were fixed with a clip to fabricate an evaluation sample. This evaluation sample was left to stand in a heating bath in which the inside of the bath was kept at a constant temperature of 100° C. After 24 hours from standing, the evaluation sample was taken out from the heating bath and the clip was removed, and then the contacted white piece was visually observed. The degree of color migration (bleed) from the molded article to the contacted white piece was rated as follows.

A: No bleed was observed.

B: Bleed was observed only at the contacted portion

C: Contamination was observed (sublimated) not only on the contacted portion but also on the non-contacted portion.

As a result, there was no color migration to the contacted white piece, and it was rate as "A".

Example 1-3

In a stainless steel tumbler, 499.5 g of a polyamide 66 resin (manufactured by DuPont, product name: Zytel (registered trademark) 70G33L) and 0.5 g of the benzimidazole ring-containing fused ring compound obtained in Synthesis Example 1 were charged, followed by mixing with stirring for 1 hour to fabricate a colored resin composition. This colored resin composition is charged in an injection molding machine (manufactured by Toyo Machinery & Metal Co., LTD., product name: Si-50), and a molded article for tensile evaluation and a molded article for impact properties were fabricated at a cylinder temperature of 290° C. and a mold temperature of 80° C. These molded articles were processed into test pieces having the shape of 1A type test piece for tensile evaluation in accordance with JIS K7162 (2014) and test pieces having the shape of 1 type notch shape A for Charpy impact evaluation in accordance with JIS K7111-1 (2012).

Fabrication of Test Reference Plate

In the same manner as in Example 1-3, except that no colorant was used, the operation was performed and test pieces for tensile evaluation and test pieces for Charpy impact evaluation were fabricated.

Evaluation of Tensile Properties

In accordance with JIS K7161-1 (2014), using a Tensilon universal testing machine (manufactured by ORIENTEC CORPORATION, product name: RTC-1310A), test pieces for tensile evaluation of Example 1-3 were tested at a tensile speed of 5 mm/min. The tensile strength thus obtained was 196.03 MPa. Similarly, a test piece for tensile evaluation of the test reference plate was tested. The tensile strength thus obtained was 196.26 MPa. It has been found that the tensile strength of the test piece for tensile evaluation of Example 1-3 is almost the same value as that of the test reference plate which is the same resin molded plate containing no colorant, and the mechanical strength does not decrease due to the inclusion of the colorant.

Evaluation of Impact Properties

In accordance with JIS K7111-2 (2006), using a digital impact tester (manufactured by Toyo Seiki Seisaku-sho, Ltd., product name: DG-UB), an impact was applied to the test pieces for Charpy impact evaluation of Example 1-3 at a hammer capacity of 1 J and an impact velocity of 2.9 m/seconds. The breaking energy was 0.483 J and the impact strength was 15.50 $kJ/m^2$. Similarly, an impact was applied to the test piece for Charpy impact evaluation of the test reference plate. The breaking energy was 0.481 J and the impact strength was 14.88 $kJ/m^2$. It has been found that the impact strength of the test pieces for Charpy impact evaluation of Example 1-3 is almost the same value as that of the test reference plate which is the same resin molded plate containing no colorant, and the mechanical strength does not decrease due to the inclusion of the colorant.

Example 2-1

In a stainless steel tumbler, 499.95 g of a polyamide 66 resin (manufactured by DuPont, product name: Zytel (registered trademark) 70G33L) and 0.05 g of the benzimidazole ring-containing fused ring compound obtained in Synthesis Example 2 were charged, followed by mixing with stirring for 1 hour to fabricate a colored resin composition. This colored resin composition was charged in an injection molding machine (manufactured by Toyo Machinery & Metal Co., LTD., product name: Si-50) and then injection molded by a conventional method at a cylinder temperature of 290° C. and a mold temperature of 80° C. Thus, one molded article having a 1 mm thick portion was fabricated. The appearance and surface gloss of this molded article were satisfactory, and exhibited uniform orange color without color unevenness.

Example 2-2

In the same manner as in Example 2-1, except that the colored resin composition prepared in Example 2-1 was allowed to retain in the cylinder of the injection molding machine for 3 minutes after charging in the injection molding machine, and then injection-molded, the operation was performed to fabricate one molded article of Example 2-2.

Evaluation of Heat Retention Resistance Property of Molded Article

The hues of the molded article of Example 2-1 and the molded article of Example 2-2 were measured in the same manner as in Examples 1-1 and 1-2, and then a color difference ΔE was determined from the results. As a result, ΔE=3.03.

The bleed resistance of the molded article of Example 2-1 was evaluated by the same operation as in Example 1-1. As a result, there was no color migration to the contacted white piece, and it was rated as "A".

Example 3-1

In stainless steel tumbler, 499.5 g of a polyamide 66 resin (manufactured by DuPont, product name: Zytel (registered trademark) 70G33L) and 0.5 g of the pyrimidine ring-containing fused ring compound obtained in Synthesis Example 3 were charged, followed by mixing with stirring for 1 hour to prepare a colored resin composition. This colored resin composition was charged in an injection molding machine (manufactured by Toyo Machinery & Metal Co., LTD., product name: Si-50) and then injection molded by a conventional method at a cylinder temperature of 290° C. and a mold temperature of 80° C. Thus, one molded article having a 1 mm thick portion was fabricated. The appearance and surface gloss of this molded article were satisfactory, and exhibited uniform red color without color unevenness.

Example 3-2

In the same manner as in Example 3-1, except that the colored resin composition prepared in Example 3-1 was allowed to retain in the cylinder of the injection molding machine for 3 minutes after charging in the injection molding machine, and then injection-molded, the operation was performed to fabricate one molded article of Example 3-2.

Evaluation of Heat Retention Resistance of Molded Article

The hues of the molded article of Example 3-1 and the molded article of Example 3-2 were measured in the same manner as in Examples 1-1 and 1-2, and a color difference ΔE was determined from the results. As a result, ΔE=1.40.

Evaluation of Bleed Resistance

By the same operation as in Example 1-1, the bleed resistance of the molded article of Example 3-1 was evaluated. As a result, there was no color migration to the contacted white piece, and it was evaluated as "A".

Example 4-1

In a stainless steel tumbler, 499.5 g of a polyamide 66 resin (manufactured by DuPont, product name: Zytel (registered trademark) 70G33L) and 0.5 g of the isoindolinone ring-containing fused ring compound obtained in Synthesis Example 4 were charged, followed by mixing with stirring for 1 hour to prepare a colored resin composition. This colored resin composition was charged in an injection molding machine (manufactured by Toyo Machinery & Metal Co., LTD., product name: Si-50) and then injection molded at a cylinder temperature of 290° C. and a mold temperature of 80° C. Thus, one molded article having a 1 mm thick portion was fabricated. The appearance and surface gloss of this molded article were satisfactory, and it exhibited uniform red color without color unevenness.

Example 4-2

In the same manner as in Example 4-1, except that the colored resin composition prepared in Example 4-1 was allowed to retain in the cylinder of the injection molding machine for 3 minutes after charging in the injection molding machine, and then injection-molded, the operation was performed to fabricate one molded article of Example 4-2.

Evaluation of Heat Retention Resistance of Molded Article

The hues of the molded article of Example 4-1 and the molded article of Example 4-2 were measured in the same manner as in Examples 1-1 and 1-2, and a color difference ΔE was determined from the results. As a result, ΔE=2.27.

Evaluation of Bleed Resistance

By the same operation as in Example 1-1, the bleed resistance of the molded article of Example 4-1 was evaluated. As a result, there was no color migration to the contacted white piece, and it was evaluated as "A".

Comparative Example 1-1

In a stainless steel tumbler, 499.5 g of a polyamide 66 resin (manufactured by DuPont, product name: Zytel (registered trademark) 70G33L) and 0.5 g of C.I. Pigment Orange 43 (manufactured by Clariant, product name: PV Fast Orange GRL) were charged, followed by mixing with stirring for 1 hour. The mixture thus obtained was charged in an injection molding machine (manufactured by Toyo Machinery & Metal Co., LTD., product name: Si-50) and then injection molded at a cylinder temperature of 290° C. and a mold temperature of 80° C. by a conventional method. Thus, one molded article having a 1 mm thick portion was fabricated. The appearance and surface gloss of this molded article were satisfactory, and exhibited uniform orange color without color unevenness.

Comparative Example 1-2

In the same manner as in Comparative Example 1-1, except that the colored resin composition prepared in Comparative Example 1-1 was allowed to retain in the cylinder of the injection molding machine for 3 minutes after charging in the injection molding machine, and then injection-molded, the operation was performed to fabricate one molded article of Comparative Example 1-2.

(Evaluation of Heat Retention Resistance of Molded Article)

The hues of the molded article of Comparative Example 1-1 and the molded article of Comparative Example 1-2 were measured in the same manner as in Examples 1-1 and 1-2, and a color difference ΔE was determined from the results. As a result, ΔE=4.48.

Evaluation of Bleed Resistance

By the same operation as in Example 1-1, the bleed resistance of the molded article of Comparative Example 1-1 was evaluated. As a result, there was color migration to the contacted white piece, and it was evaluated as "B".

The color differences ΔE of the molded articles of Examples 1-1, 2-1, 3-1 and 4-1, and Comparative Example 1-1 and the results of the bleed resistance test at a temperature in the tank of 100° C. are summarized in Table 4.

TABLE 4

| | | Example | | | | Comparative Example |
|---|---|---|---|---|---|---|
| | | 1-1 | 2-1 | 3-1 | 4-1 | 1-1 |
| Colorant | | Compound ($1a_1$-1) | Compound ($1a_2$-1) | Compound (1b-1) | Compound (1c-2) | C.I. Pigment Orange 43 |
| Type of resin | | PA66 | PA66 | PA66 | PA66 | PA66 |
| Color difference (ΔE) in evaluation of heat retention resistance | | 2.23 | 3.03 | 1.40 | 2.27 | 4.48 |
| Evaluation of bleed resistance | Test temperature (° C.) | 100 | 100 | 100 | 100 | 100 |
| | Evaluation results | A | A | A | A | B |

*PA = polyamide

Since the colorants of Examples of the present invention exhibit extraordinarily little change in color even when maintained at high temperature in an injection molding machine, and cause no color migration even when brought into contact with a contacted white piece, it has been found that the colorants have high bleed resistance.

Colorant Example 1

In a stainless steel tumbler, 100 g of a benzimidazole ring-containing fused ring compound which is an orange dye obtained in Synthesis Example 1, 7.5 g of a pyrimidine ring-containing fused ring compound which is a red dye obtained in Synthesis Example 3, and 100 g of titanium oxide (TIPAQUE (registered trademark) CR62, manufactured by ISHIHARA SANGYO KAISHA, LTD.) as a white pigment were charged, followed by mixing with stirring for 1 hour to prepare Colorant Example 1.

Colorant Example 2

In a stainless steel tumbler, 20 g of a benzimidazole ring-containing fused ring compound which is an orange dye obtained in Synthesis Example 1, 20 g of a benzimidazole ring-containing fused ring compound which is also an orange dye obtained in Synthesis Example 2, 10 g of a pyrimidine ring-containing fused ring compound which is a red dye obtained in Synthesis Example 3, and 200 g of titanium oxide (TIPAQUE (registered trademark) CR62, manufactured by ISHIHARA SANGYO KAISHA, LTD.) as a white pigment were charged, followed by mixing with stirring for 1 hour to prepare Colorant Example 2.

Master Batch Example 1

In a stainless steel tumbler, 900 g of a polyamide 66 resin (manufactured by DuPont, product name: Zytel (registered trademark) 10INC010) and 100 g of the colorant obtained in Colorant Example 1 were charged, followed by mixing with stirring for 1 hour. The mixture thus obtained was melt-mixed at a cylinder temperature of 290° C. using a single-screw extruder (manufactured by Enpla-Sangyo K. K., product name: E30SV). While cooling in a water bath, the mixture was cut by a pelletizer to obtain colored pellets. Thereafter, an orange master batch including a colorant concentration of 10% by mass was obtained through a drying process.

Master Batch Example 2

In a stainless steel tumbler, 900 g of a polyamide 9T resin (manufactured by KURARAY CO., LTD., product name: Genestar (registered trademark) G1300A) and 100 g of the colorant obtained in Colorant Example 2 were charged, followed by mixing with stirring for 1 hour. The mixture thus obtained was melt-mixed at a cylinder temperature of 290° C. using a single-screw extruder (manufactured by Enpla-Sangyo K. K., product name: E30SV). While cooling in a water bath, the mixture was cut by a pelletizer to obtain colored pellets. Thereafter, an orange master batch having a colorant concentration of 10% by mass was obtained through a drying process.

Master Batch Example 3

In a stainless steel tumbler, 900 g of a polyamide 66 resin (manufactured by DuPont, product name: Zytel (registered trademark) 10INC010) and 100 g of the benzimidazole ring-containing fused ring compound obtained in Synthesis Example 1 were charged, followed by mixing with stirring for 1 hour. The mixture thus obtained was melt-mixed at a cylinder temperature of 290° C. using a single-screw extruder (manufactured by Enpla-Sangyo K. K., product name: E30SV). While cooling in a water bath, the mixture was cut by a pelletizer to obtain colored pellets. Thereafter, an orange master batch having a colorant concentration of 10% by mass was obtained through a drying process.

Master Batch Example 4

In a stainless steel tumbler, 900 g of a polyamide 9T resin (manufactured by KURARAY CO., LTD., product name: Genestar (registered trademark) G1300A) and 100 g of the benzimidazole ring-containing fused ring compound obtained in Synthesis Example 1 were charged, followed by mixing with stirring for 1 hour. The mixture thus obtained was melt-mixed at a cylinder temperature of 290° C. using a single-screw extruder (manufactured by Enpla-Sangyo K. K., product name: E30SV). While cooling in a water bath, the mixture was cut by a pelletizer to obtain colored pellets. Thereafter, an orange master batch having a colorant concentration of 10% by mass was obtained through a drying process.

Example 5-1

In a stainless steel tumbler, 840 g of a polyamide 66 resin (manufactured by Asahi Kasei Corporation, product name: LEONA (registered trademark) FH772) and 10 g of the master batch of Master Batch Example 1 were charged, followed by mixing with stirring for 1 hour to prepare a colored resin composition. This colored resin composition was charged in an injection molding machine (manufactured by Toyo Machinery & Metal Co., LTD., product name: Si-50) in order to be molded at a cylinder temperature of 290° C. (nozzle tip temperature of 290° C.) and a mold temperature of 85° C. by a conventional method to fabricate one molded article of Example 5-1, which is rectangular in a plan view having a size of 80 mm long×50 mm wide and 1 mm thick portion and 3 mm thick portion, and exhibits orange color.

Hue Measurement

In the same manner as in the hue measurement in "Evaluation of Heat Retention Resistance of Molded Article" for the molded article of Example 1-1, the operation was performed to measure the hue of the molded article of Example 5-1. As a result, it exhibited a dark orange hue of $L^*=65.49$, $a^*=38.49$ and $b^*=83.55$.

Example 5-2

In the same manner as in Example 5-1, except that the colored resin composition prepared in Example 5-1 was allowed to retain in the cylinder of the injection molding machine for 3 minutes after charging in the injection molding machine, and then injection-molded, the operation was performed to fabricate one molded article of Example 5-2.

Evaluation of Heat Retention Resistance of Molded Article

The hue of the molded article of Example 5-2 was measured in the same manner as in Example 1-2. The L value, a value and b value obtained there, and those values of Example 5-1 obtained in the above "Hue Measurement" were calculated in the same manner as in "Evaluation of Heat Retention Resistance of Molded Article" for the molded article of Example 1-1 to determine a color difference ΔE between the two. As a result, ΔE=2.05.

Evaluation of Bleed Resistance

By the same operation as in Example 1-1, the bleed resistance of the molded article of Example 5-1 was evaluated. As a result, there was no color migration to the contacted white piece, and it was evaluated as "A".

Example 6-1

In a stainless steel tumbler, 840 g of a polyamide 9T resin (manufactured by KURARAY CO., LTD., product name:

Genestar (registered trademark) G1300A) and 10 g of the master batch of Master Batch Example 3 were charged, followed by mixing with stirring for 1 hour to prepare a colored resin composition. This colored resin composition was charged in an injection molding machine (manufactured by Toyo Machinery & Metal Co., LTD., product name: Si-50) set at a cylinder temperature of 320° C. (nozzle tip temperature of 290° C.) and a mold temperature of 135° C., and then molded by a conventional method to fabricate one molded article of Example 6-1, which is rectangular in a plan view having a size of 80 mm long×50 mm wide and 1 mm thick portion and 3 mm thick portion, and exhibits orange color.

Example 6-2

In the same manner as in Example 6-1, except that the colored resin composition prepared in Example 6-1 was allowed to retain in the cylinder of the injection molding machine for 3 minutes after charging in the injection molding machine, and then injection-molded, the operation was performed to fabricate one molded article of Example 6-2.

Evaluation of Heat Retention Resistance Property of Molded Article

The hue of the molded article of Example 6-1 and the molded article of Example 6-2 were measured in the same manner as in Examples 1-1 and 1-2, and then a color difference ΔE was determined from the results. As a result, ΔE=4.36.

Evaluation of Bleed Resistance

In the same manner as in Example 1-1, except that the temperature inside the tank was 130° C., the operation was performed and the bleed resistance of the molded article of Example 7-1 was evaluated. As a result, there was no color migration to the contacted white piece, and it was rated as "A".

Example 7-1

In a stainless steel tumbler, 840 g of a polyamide 9T resin (manufactured by KURARAY CO., LTD., product name: Genestar (registered trademark) G1300A) and 10 g of the master batch of Master Batch Example 2 were charged, followed by mixing with stirring for 1 hour to prepare a colored resin composition. This colored resin composition was charged in an injection molding machine (manufactured by Toyo Machinery & Metal Co., LTD., product name: Si-50) set at a cylinder temperature of 320° C. (nozzle tip temperature of 290° C.) and a mold temperature of 135° C., and then molded by a conventional method to fabricate one molded article of Example 7-1, which is rectangular in a plan view having a size of 80 mm long×50 mm wide and 1 mm thick portion and 3 mm thick portion, and exhibits orange color.

Hue Measurement

In the same manner as in the hue measurement in "Evaluation of Heat Retention Resistance of Molded Article" for the molded article of Example 1-1, the operation was performed to measure the hue of the molded article of Example 7-1. As a result, it exhibited the hue of L*=65.90, a*=42.70 and b*=65.72, which is equivalent to RAL2003.

Example 7-2

In the same manner as in Example 7-1, except that the colored resin composition prepared in Example 7-1 was allowed to retain in the cylinder of the injection molding machine for 3 minutes after charging in the injection molding machine, and then injection-molded, the operation was performed to fabricate one molded article of Example 7-2.

Evaluation of Heat Retention Resistance of Molded Article

The hue of the molded article of Example 7-1 and the molded article of Example 7-2 were measured in the same manner as in Examples 1-1 and 1-2, and a color difference ΔE was determined from the results. As a result, ΔE=6.64.

Evaluation of Bleed Resistance

By the same operation as in Example 6-1, the bleed resistance of the molded article of Example 7-1 was evaluated. As a result, there was no color migration to the contacted white piece, and it was evaluated as "A".

Example 8-1

In a stainless steel tumbler, 499.5 g of a polyamide 9T resin (manufactured by KURARAY Co., Ltd., product name: Genestar (registered trademark) G1300A) and 0.5 g of the pyrimidine ring-containing fused ring compound obtained in Synthesis Example 3 were charged, followed by mixing with stirring for 1 hour to prepare a colored resin composition. This colored resin composition was charged in an injection molding machine (manufactured by Toyo Machinery & Metal Co., LTD., product name: Si-50) and then injection molded at a cylinder temperature of 320° C. and a mold temperature of 135° C. by a conventional method. Thus, one molded article having a 1 mm thick portion was fabricated. The appearance and surface gloss of this molded article were satisfactory, and it exhibited uniform red color without color unevenness.

Example 8-2

In the same manner as in Example 8-1, except that the colored resin composition prepared in Example 8-1 was allowed to retain in the cylinder of the injection molding machine for 3 minutes after charging in the injection molding machine, and then injection-molded, the operation was performed to fabricate one molded article of Example 8-2.

Evaluation of Heat Retention Resistance of Molded Article

The hue of the molded article of Example 8-1 and the molded article of Example 8-2 were measured in the same manner as in Examples 1-1 and 1-2, and a color difference ΔE was determined from the results. As a result, ΔE=1.40.

Evaluation of Bleed Resistance

By the same operation as in Example 6-1, the bleed resistance of the molded article of Example 8-1 was evaluated. As a result, there was no color migration to the contacted white piece, and it was evaluated as "A".

Example 9-1

In a stainless steel tumbler, 499.5 g of a polyamide 9T resin (manufactured by KURARAY Co., Ltd., product name: Genestar (registered trademark) G1300A) and 0.5 g of the isoindolinone ring-containing fused ring compound obtained in Synthesis Example 4 were charged, followed by mixing with stirring for 1 hour to prepare a colored resin composition. This colored resin composition was charged in an injection molding machine (manufactured by Toyo Machinery & Metal Co., LTD., product name: Si-50) and then injection molded at a cylinder temperature of 320° C. and a mold temperature of 135° C. by a conventional method. Thus, one molded article having a 1 mm thick portion was fabricated. The appearance and surface gloss of this molded article were satisfactory, and it exhibited uniform red color without color unevenness.

Example 9-2

In the same manner as in Example 9-1, except that the colored resin composition prepared in Example 9-1 was allowed to retain in the cylinder of the injection molding machine for 3 minutes after charging in the injection molding machine, and then injection-molded, the operation was performed to fabricate one molded article of Example 9-2.

Evaluation of Heat Retention Resistance of Molded Article

The hue of the molded article of Example 9-1 and the molded article of Example 9-2 were measured in the same manner as in Examples 1-1 and 1-2, and a color difference ΔE was determined from the results. As a result, ΔE=0.83.

Evaluation of Bleed Resistance

By the same operation as in Example 6-1, the bleed resistance of the molded article of Example 9-1 was evaluated. As a result, there was no color migration to the contacted white piece, and it was evaluated as "A".

Example 10-1

In a stainless steel tumbler, 399.6 g of a polyphenylene sulfide resin (manufactured by Polyplastics Co., Ltd., product name: DURAFIDE (registered trademark) 1130A6), 0.32 g of the benzimidazole ring-containing fused ring compound obtained in Synthesis Example 1 which is an orange dye and 0.08 g of other benzimidazole ring-containing fused ring compound obtained in Synthesis Example 2 which is also an orange dye were charged, followed by mixing with stirring for 1 hour to prepare a colored resin composition. This colored resin composition was charged in an injection molding machine (manufactured by Toyo Machinery & Metal Co., LTD., product name: Si-50-6s) and then injection molded at a cylinder temperature of 310° C. and a mold temperature of 140° C. by a conventional method. Thus, one molded article having a 1 mm thick portion was fabricated. The appearance and surface gloss of this molded article were satisfactory, and it exhibited uniform orange color without color unevenness.

Hue Measurement

In the same manner as in the hue measurement in "Evaluation of Heat Retention Resistance of Molded Article" for the molded article of Example 1-1, the operation was performed to measure the hue of the molded article of Example 10-1. As a result, it exhibited a dark orange hue of L*=66.24, a*=39.64 and b*=62.68.

Example 10-2

In the same manner as in Example 10-1, except that the colored resin composition prepared in Example 10-1 was allowed to retain in the cylinder of the injection molding machine for 3 minutes after charging in the injection molding machine, and then injection-molded, the operation was performed to fabricate one molded article of Example 10-2.

Evaluation of Heat Retention Resistance of Molded Article

The hues of the molded article of Example 10-1 and the molded article of Example 10-2 were measured in the same manner as in Examples 1-1 and 1-2, and a color difference ΔE was determined from the results. As a result, ΔE=4.54.

Evaluation of Bleed Resistance

By the same operation as in Example 6-1, the bleed resistance of the molded article of Example 10-1 was evaluated. As a result, there was no color migration to the contacted white piece, and it was evaluated as "A".

Comparative Example 2-1

In a stainless steel tumbler, 499.5 g of a polyamide 9T resin (manufactured by KURARAY Co., Ltd., product name: Genestar (registered trademark) G1300A) and 0.5 g of C.I. Pigment Orange 43 (manufactured by Clariant, product name: PV Fast Orange GRL) as a colorant were charged, followed by mixing with stirring for 1 hour. The mixture thus obtained was charged in an injection molding machine (manufactured by Toyo Machinery & Metal Co., LTD., product name: Si-50) and then injection molded at a cylinder temperature of 320° C. and a mold temperature of 135° C. by a conventional method. Thus, one molded article having a 1 mm thick portion was fabricated. The appearance and surface gloss of this molded article were satisfactory, and it exhibited uniform orange color without color unevenness.

Comparative Example 2-2

In the same manner as in Comparative Example 1-1, except that the mixture prepared in Comparative Example 2-1 was allowed to retain in the cylinder of the injection molding machine for 3 minutes after being charged in the injection molding machine, and then injection-molded, the operation was performed to fabricate one molded article of Comparative Example 2-2.

Evaluation of Heat Retention Resistance of Molded Article

The hue of the molded article of Comparative Example 2-1 and the molded article of Comparative Example 2-2 were measured in the same manner as in Examples 1-1 and 1-2, and a color difference ΔE was determined from the results. As a result, ΔE=7.50.

Evaluation of Bleed Resistance

By the same operation as in Example 6-1, the bleed resistance of the molded article of Comparative Example 1-1 was evaluated. As a result, there was color migration to the contacted white piece, and it was evaluated as "B".

Every color difference ΔE of the molded articles of Examples 6-1, 7-1, 8-1, 9-1 and 10-1, and Comparative Example 2-1 and the results of the bleeding test at a temperature in the tank of 130° C. are summarized in Table 5.

TABLE 5

| | | Example | | | | | Comparative Example |
|---|---|---|---|---|---|---|---|
| | | 6-1 | 7-1 | 8-1 | 9-1 | 10-1 | 2-1 |
| Colorant or master batch | | Master Batch Example 3 containing compound ($1a_1$-1) as colorant | Master Batch Example 2 containing compounds ($1a_1$-1) and ($1a_2$-1) as colorant | Compound (1b-1) | Compound (1c-2) | Compounds ($1a_1$-1) and ($1a_2$-1) | C.I. Pigment Orange 43 |
| Type of resin | | PA9T | PA9T | PA9T | PA9T | PPS | PA9T |
| Color difference (ΔE) in evaluation of heat retention resistance | | 4.36 | 6.64 | 1.40 | 0.83 | 4.54 | 7.50 |
| Evaluation of bleed resistance | Test temperature (° C.) | 130 | 130 | 130 | 130 | 130 | 130 |
| | Evaluation results | A | A | A | A | A | B |

*PA = polyamide, PPS = polyphenylene sulfide

Since the colorants of Examples of the present invention exhibit extraordinarily little change in color even when maintained at high temperature in an injection molding machine, and cause no color migration even when brought into contact with a contacted white piece, it has been found that the colorants have high bleed resistance.

Example 11

Using the colored resin composition prepared in Example 1-1, a connector housing for automotive wire harnesses was produced by insert-molding metal parts that provide electrical connection by fixing it in a mold. This connector housing exhibited bright orange color.

INDUSTRIAL APPLICABILITY

The colorant, the master batch containing same, and the colored resin composition of the present invention are used to produce a colored molded article, and this molded article is used for connector housings and connector housings of high-voltage wire harnesses and electric wire coating materials used in automobiles, laser-welded parts manufactured by laser-welding multiple parts such as intake manifolds and engine covers for internal combustion engines, medical tubes used for drip infusions and nutritional supplements, food packaging materials such as spout pouches containing liquid foods and beverage compositions, and caps or labels for PET bottles.

What is claimed is:

1. A master batch comprising a first thermoplastic resin and a colorant, the colorant comprising:

at least one compound represented by the following chemical formula (1a):

[Chemical Formula 1]

(1a)

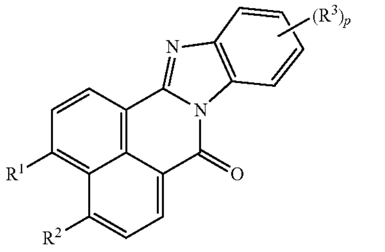

wherein, in the chemical formula (1a), $R^1$ and $R^2$ are each independently a hydrogen atom, an optionally substituted nitrogen-containing heterocyclic group, and both are not simultaneously hydrogen atoms, $R^3$ is at least one selected from a straight or branched alkoxy group having 1 to 4 carbon atoms, a carboxy group, a hydroxy group, a sulfo group and a sulfonamide group, and p is a number of 1 to 2, at least one compound represented by the following chemical formula ($1a_2$):

[Chemical Formula 1′]

($1a_2$)

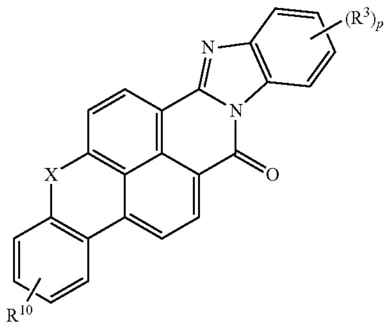

wherein, in the chemical formula ($1a_2$), $R^3$ and p are the same as in the chemical formula (1a), $R^{10}$ is a hydrogen atom, a carboxy group, or a straight or branched alkyl group having 1 to 4 carbon atoms, and X is an oxygen atom or a sulfur atom, at least one compound represented by the following chemical formula (1b):

[Chemical Formula 2]

(1b)

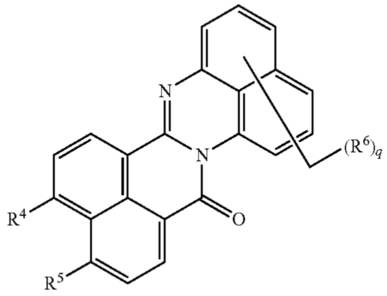

wherein, in the chemical formula (1b), $R^4$ and $R^5$ are each independently a hydrogen atom or an optionally substituted nitrogen-containing heterocyclic group, and both are not simultaneously hydrogen atoms, $R^6$ is at least one selected from a straight or branched alkoxy group having 1 to 4 carbon atoms, a carboxy group, a hydroxy group, a sulfo group and a sulfonamide group, q is a number of 0 to 4, and/or at least one compound represented by the following chemical formula (1c):

[Chemical Formula 3]

(1c)

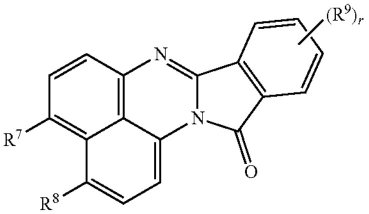

wherein, in the chemical formula (1c), $R^7$ and $R^8$ are each independently a hydrogen atom or an optionally substituted nitrogen-containing heterocyclic group, $R^9$ is at least one selected from a straight or branched alkoxy group having 1 to 4 carbon atoms, a carboxy group, a hydroxy group, a sulfo group and a sulfonamide group, and r is a number of 0 to 2, wherein the nitrogen-containing heterocyclic group is at least one selected from a morpholino group, a piperidinyl group, a pyrrolidinyl group and a piperazinyl group, and wherein a content of the colorant is 5 to 30% by mass.

2. The master batch according to claim 1, wherein the colorant further comprises:

the compound represented by the chemical formula (1a), and a compound represented by the chemical formula (1a') which is different from the chemical formula (1a):

[Chemical Formula 1″]

(1a')

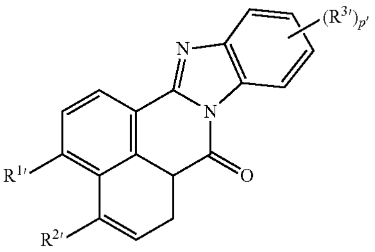

wherein, in the chemical formula (1a'), $R^{1'}$ and $R^2$ are optionally substituted amino group or nitrogen-containing heterocyclic group optionally substituted or combined together to form a fused ring, $R^{3'}$ is at least one selected from a straight or branched alkoxy group having 1 to 4 carbon atoms, a carboxy group, a hydroxy group, a sulfo group and a sulfonamide group, and p' is a number of 0 to 2.

3. The master batch according to claim 1, wherein the nitrogen-containing heterocyclic group has at least one substituted selected from a straight or branched alkyl group having 1 to 4 carbon atoms, a straight or branched alkoxy group having 1 to 4 carbon atoms, a hydroxy group and a carboxy group.

4. A colored resin composition comprising the master batch according to claim 1.

5. The colored resin composition according to claim 4, wherein the first thermoplastic resin includes at least one selected from a polyamide resin, a polyolefin resin, a polyester resin, a polycarbonate resin and a polyphenylene sulfide resin.

6. The colored resin composition according to claim 4, further comprising the second thermoplastic resin.

7. A molded article molded formed by molding the colored resin composition according to claim 4.

8. The molded article according to claim 7, which is a connector housing for automotive wire harnesses.

* * * * *